United States Patent
Okuno

(10) Patent No.: US 10,014,504 B2
(45) Date of Patent: Jul. 3, 2018

(54) SEPARATOR, BATTERY, BATTERY PACK, ELECTRONIC DEVICE, ELECTRIC VEHICLE, POWER STORAGE DEVICE, AND POWER SYSTEM

(71) Applicant: Sony Corporation, Tokyo (JP)

(72) Inventor: Moriaki Okuno, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/370,669

(22) PCT Filed: Dec. 4, 2012

(86) PCT No.: PCT/JP2012/081866
§ 371 (c)(1),
(2) Date: Jul. 3, 2014

(87) PCT Pub. No.: WO2013/108510
PCT Pub. Date: Jul. 25, 2013

(65) Prior Publication Data
US 2015/0295216 A1    Oct. 15, 2015

(30) Foreign Application Priority Data
Jan. 18, 2012  (JP) .................. 2012-008410

(51) Int. Cl.
*H01M 2/16*    (2006.01)
*H01M 10/0525*    (2010.01)
(Continued)

(52) U.S. Cl.
CPC ......... *H01M 2/1686* (2013.01); *H01M 2/166* (2013.01); *H01M 2/1653* (2013.01);
(Continued)

(58) Field of Classification Search
None
See application file for complete search history.

(56) References Cited

U.S. PATENT DOCUMENTS 5,877,935 A * 3/1999 Sato ........................ H01G 9/155
361/502
6,627,346 B1 * 9/2003 Kinouchi .............. H01M 2/166
429/144
(Continued)

FOREIGN PATENT DOCUMENTS

JP    2005-108538    4/2005
JP    2006-147569    6/2006
(Continued)

OTHER PUBLICATIONS

International Search Report issued in connection with International Patent Application No. PCT/JP2012/081866, dated Jan. 15, 2013. (2 pages).
(Continued)

Primary Examiner — Maria J Laios
(74) Attorney, Agent, or Firm — K&L Gates LLP

(57) ABSTRACT

Provided is a separator including a first layer of a porous substance and a second layer that is provided on at least one face of the first layer and that includes a resin material and particles. The second layer has an agglomeration network structure of the particles.

16 Claims, 13 Drawing Sheets

(51) Int. Cl.
*H02J 7/00* (2006.01)
*H01M 10/052* (2010.01)

(52) U.S. Cl.
CPC ....... *H01M 10/0525* (2013.01); *H02J 7/0021* (2013.01); *H02J 7/0068* (2013.01); *H01M 10/052* (2013.01); *H01M 2220/20* (2013.01); *H02J 2007/0096* (2013.01); *Y02E 60/122* (2013.01); *Y02P 70/54* (2015.11); *Y02T 10/7055* (2013.01)

(56) References Cited

U.S. PATENT DOCUMENTS

| | | | |
|---|---|---|---|
| 2006/0024569 A1* | 2/2006 | Hennige | H01M 2/162 429/144 |
| 2006/0105245 A1 | 5/2006 | Ikuta et al. | |
| 2006/0134526 A1 | 6/2006 | Han et al. | |
| 2008/0070107 A1 | 3/2008 | Kasamatsu et al. | |
| 2011/0135991 A1 | 6/2011 | Sato | |

FOREIGN PATENT DOCUMENTS

| | | | |
|---|---|---|---|
| JP | 2006-351386 | * 12/2006 | ............ H01M 10/40 |
| JP | 4159090 | 10/2008 | |
| JP | 2010-010037 | 1/2010 | |
| JP | 2010-257689 | 11/2010 | |
| JP | 2011-138762 | 7/2011 | |
| JP | 2011229276 | 11/2011 | |
| JP | 2012-074367 | 4/2012 | |
| WO | 2005/124899 | 12/2005 | |
| WO | 2006/061936 | 6/2006 | |
| WO | 2011070964 | 6/2011 | |
| WO | 2012/099149 | 7/2012 | |
| WO | 2012/137847 | 10/2012 | |

OTHER PUBLICATIONS

Office Action issued in JP application 2013-554205, dated Nov. 24, 2015 (12 pages).

* cited by examiner

FIG. 10
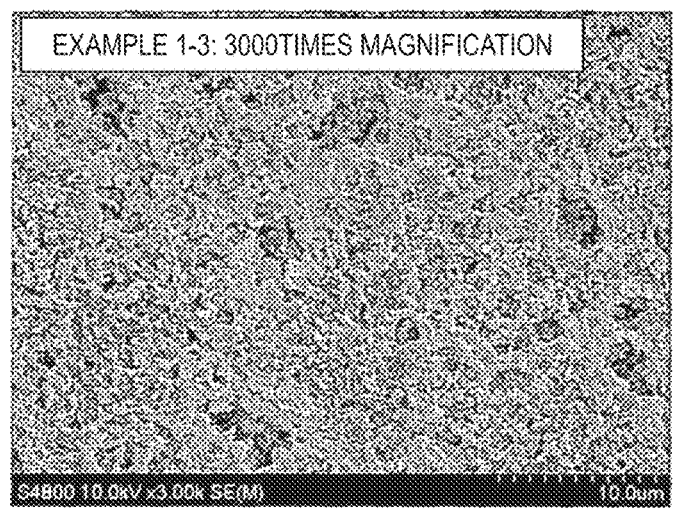
A
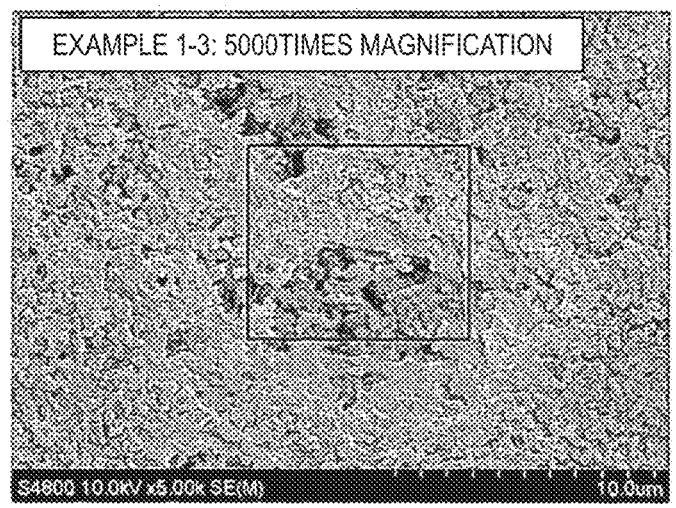
B
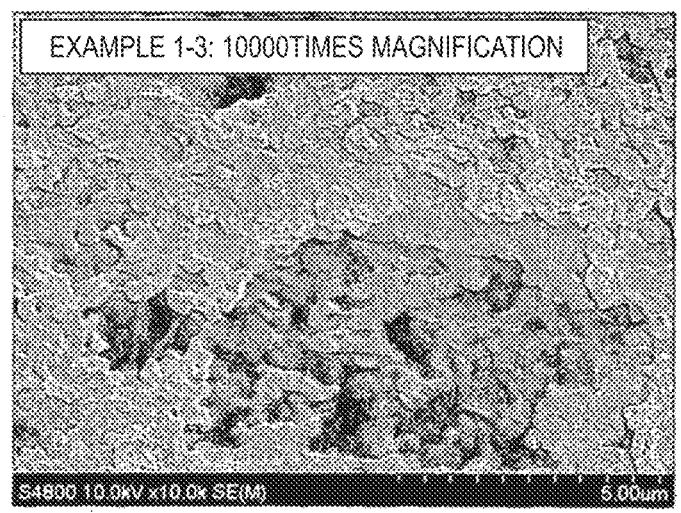
C

FIG. 11
A
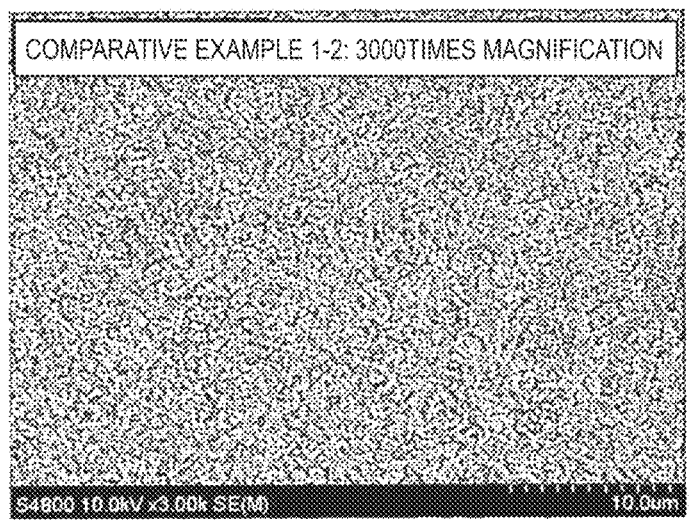
B
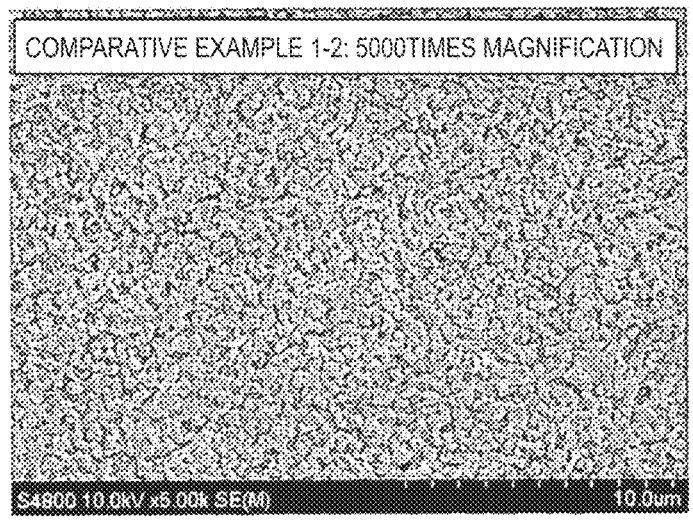
C
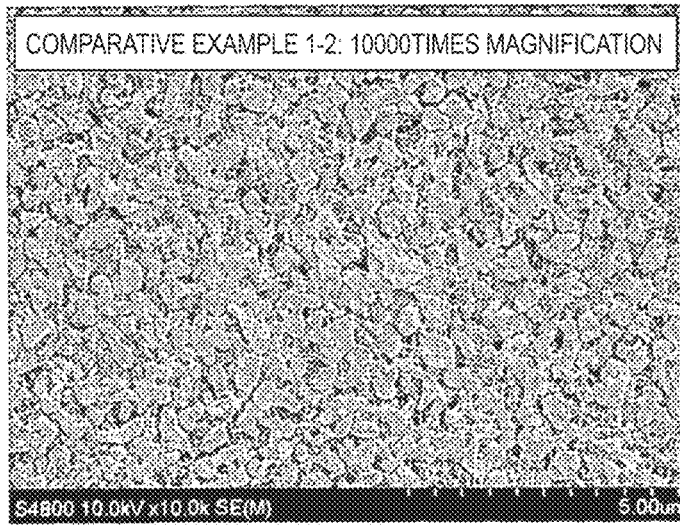

SEPARATOR, BATTERY, BATTERY PACK, ELECTRONIC DEVICE, ELECTRIC VEHICLE, POWER STORAGE DEVICE, AND POWER SYSTEM

CROSS REFERENCES TO RELATED APPLICATIONS

The present application is a national stage of International Application No. PCT/JP2012/081866 filed on Dec. 4, 2012 and claims priority to Japanese Patent Application No. 2012-008410 filed on Jan. 18, 2012, the disclosure of which is incorporated herein by reference.

BACKGROUND

The present technology relates to a separator, a battery, a battery pack, an electronic device, an electric vehicle, a power storage device, and a power system. More specifically, the present technology relates to a separator in which a second layer is provided on at least one face of a first layer.

In the past, polyolefin microporous polymer films, such as polypropylene and polyethylene, or multilayer films thereof, have been widely used as a separator. However, these separators suffer from a problem in that air hole clogging and contraction occur due to the heat generated by internal short circuits or overcharging of the battery. When the separator contracts due to the internal heat of the battery, the positive electrode and the negative electrode come into direct contact at the contracted portion, and this contact causes various problems to occur.

Accordingly, recently, to solve these problems with the separator, research has been carried out relating to separators in which a porous film that includes ceramic particles and a binder is provided on a surface. In a separator having such a configuration, heat resistance is conferred to the polyolefin material, so that melting and contraction of the polyolefin material under a high temperature environment of 120° C. or more can be suppressed.

In such a separator, not only is heat resistance conferred to the polyolefin material, but oxidation resistance, mechanical strength and the like can also be conferred. Since these effects are increased the greater the content of the ceramic particles is, in most of the related art, it is said that a range of 80% or more is preferred for the content of the ceramic particles.

However, for vehicle-mounted batteries that have been drawing attention in recent years, such batteries need to achieve a high power density. In order to meet this requirement, various investigations regarding the respective battery parts have been performed. There is a need for a technique to increase the pore size and the porosity in the separator.

To meet this requirement, Patent Literature 1 proposes a technique for increasing the pore size and the porosity by appropriately suppressing solution/solvent replacement and solvent diffusion by, before dipping a polymer solution in a poor solvent bath, absorbing moisture to form a thin porous film on the surface.

Further, to meet the need for even higher battery capacity, alloy-based negative electrodes are being investigated that have silicon (Si) or tin (Sn) as new negative electrode materials. Since such an alloy-based negative electrode tends to expand in volume during charging, there is a need for a separator that can absorb the expansion in volume of the electrode by crumpling.

CITATION LIST

Patent Literature

Patent Literature 1: JP 4159090B

SUMMARY

Technical Problem

However, the technique described in Patent Literature 1 increases the pore size and the porosity of a porous film that only includes a resin material. Patent Literature 1 does not describe a technique for increasing the pore size and the porosity of a porous film that includes a resin material and ceramic particles. Further, in Patent Literature 1, there is no description regarding a technique for absorbing expansion in the volume of an electrode for a porous film that includes a resin material and ceramic particles.

Therefore, it is an object of the present technology to provide a separator that has a large pore size and a high porosity and that is capable of absorbing electrode expansion, a battery including such separator, and a battery pack, an electronic device, an electric vehicle, a power storage device, and a power system that include that battery.

Solution to Problem

In order to solve the above-mentioned problem, according to the first embodiment of the present technology, there is provided a separator including a first layer of a porous substance, and a second layer that is provided on at least one face of the first layer and that includes a resin material and particles. The second layer has an agglomeration network structure of the particles.

According to the second embodiment of the present technology, there is provided battery that includes a positive electrode, a negative electrode, an electrolyte, and a separator. The separator includes a first layer of a porous substance, and a second layer that is provided on at least one face of the first layer and that includes a resin material and particles. The second layer has an agglomeration network structure of the particles.

The battery pack, electronic device, electric vehicle, power storage device, and power system according to the present technology are characterized by including a battery having the separator according to the first embodiment of the present technology, or the battery according to the second embodiment of the present technology.

In the present technology, since the second layer has an agglomeration network structure of particles, a large pore size and a high porosity can be obtained. Further, since the agglomeration network structure of particles is a structure that crumples by applying pressure, when a separator having the second layer provided on at least one face of the first layer is included in a battery, electrode expansion can be absorbed by the crumpling of the second layer of the battery that occurs with the expansion of the electrode.

Advantageous Effects of Invention

According to the present invention, a separator can be realized that has a large pore size and a high porosity, and is capable of absorbing electrode expansion. Additional features and advantages are described herein, and will be apparent from the following Detailed Description and the figures.

BRIEF DESCRIPTION OF THE FIGURES

FIGS. 10A to 10C are diagrams illustrating a surface SEM image of a surface layer of Example 1-3.

FIGS. 11A to 11C are diagrams illustrating a surface SEM image of a surface layer of Comparative Example 1-2.

DETAILED DESCRIPTION

Hereinafter, preferred embodiments of the present invention will be described in detail with reference to the appended drawings. Note that, in this specification and the drawings, elements that have substantially the same function and structure are denoted with the same reference signs, and repeated explanation is omitted. Embodiments of the present technology will be described in the following order with reference to the drawings.
1. First embodiment (separator example)
2. Second embodiment (cylindrical battery example)
3. Third embodiment (flat battery example)
4. Fourth embodiment (battery pack example)
5. Fifth embodiment (power storage system example)

1. First Embodiment

Separator Configuration

Figure 1:
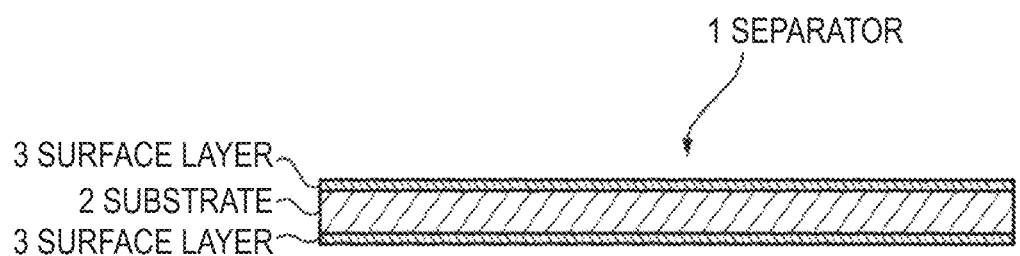
FIG. 1 is a cross-sectional view illustrating a configuration example of a separator according to a first embodiment of the present technology.

FIG. 1 is a cross-sectional view illustrating a configuration example of a separator according to the first embodiment of the present technology. A separator 1 includes a substrate (a first layer) 2 and a surface layer (a second layer) 3 provided on at least one face of the substrate 2. It is noted that in FIG. 1, although an example is illustrated in which the surface layer 3 is provided on both faces of the substrate 2, the surface layer 3 may also be provided on just one of the faces of the substrate 2.

The separator 1 separates a positive electrode and a negative electrode in a battery to suppress current short circuiting caused by contact between the two electrodes. An electrolyte is impregnated in the separator 1. It is preferred that the separator 1 is applied in a battery in which electrode expansion due to charging or discharging is substantial. If the surface layer 3 is provided on only one face of the substrate 2, it is preferred to provide the surface layer 3 on the face that opposes the electrode that suffers from substantial expansion from charging or discharging.

For example, if the separator 1 is applied in a battery that suffers from substantial expansion of the negative electrode due to charging, during expansion of the negative electrode due to charging, the surface layer 3 crumples, so that the negative electrode expansion is absorbed. Consequently, the stress acting on the negative electrode from the expansion of the negative electrode can be reduced, so that damage and fracturing of the negative electrode can be suppressed. Further, for the positive electrode that is in a compressed state with the negative electrode with the separator 1 interposed therebetween, damage and fracturing of the negative electrode can be similarly suppressed.

It is especially preferred to use the separator 1 in a battery having a negative electrode that includes as a main component a metal-based material or a metal alloy-based material as a negative electrode active material. This is because remarkable effects can be exhibited by using in such a battery. For a negative electrode that includes as a main component a metal-based material or a metal alloy-based material as a negative electrode active material, expansion during charging is substantial. Therefore, the effect of suppressing damage and fracturing of the negative electrode by the separator 1 increases. It is noted that the separator 1 may also be applied in a battery that uses a carbon material, such as graphite, as a negative electrode active material.

The structure of the battery in which the separator 1 is applied is not especially limited, the separator 1 can be applied in various battery types. For example, the separator 1 can be applied in a winding-type battery in which the positive electrode and the negative electrode are wound with the separator 1 interposed therebetween, and a laminated battery in which the positive electrode and the negative electrode are folded over each other or laminated with the separator 1 interposed therebetween. However, it is preferred to apply the separator 1 in a winding-type battery. This is because remarkable effects can be exhibited by using in such a battery.

The substrate 2 and the surface layer 3 configuring the separator 1 will now be described.

(Substrate)

The substrate 2 is a porous substrate that holds an electrolyte solution in the pores of the substrate 2. As the porous substrate, for example, a porous film, nonwoven cloth, cloth and the like may be used alone or by laminating two or more kinds thereof. It is preferred that the substrate 2 has a large ion permeability, and predetermined mechanical strength and insulating properties. In addition to these properties, it is further preferred that the substrate 2 has a high resistance to the electrolyte solution, a low reactivity, and a low susceptibility to expansion. Moreover, if the separator 1 is used in a winding-type battery, it is preferred that the substrate 2 is flexible.

As the resin material forming the porous film, it is preferred to use a polyolefin resin, such as polypropylene or polyethylene, an acrylic resin, a styrene resin, a polyester resin, or a nylon resin. It is especially preferred to use a polyolefin resin, such as a polyethylene like low density polyethylene, high density polyethylene, and linear polyethylene, or a low-molecular-weight wax component thereof, or polypropylene, because such resins have a suitable melt temperature and are easily available. Further, a structure formed by laminating two or more kinds of these porous films, or a porous film formed by melt-kneading two or more kinds of resin material, may also be used. A porous film formed from a polyolefin resin has excellent separation properties between the positive electrode and the negative electrode, and can thus dramatically reduce internal short circuits.

Examples of the fibers forming nonwoven cloth that can be used include aramid fibers, glass fibers, polyolefin fibers, polyethylene terephthalate (PET) fibers, nylon fibers or the like alone or in combination of two or more kinds thereof.

The thickness of the substrate 2 can be arbitrarily set as long as it is thick enough to maintain the required strength. However, it is preferred to set the thickness in consideration of the insulation properties between the positive electrode and the negative electrode, ion permeability, and the volumetric efficiency of the active material layers in the battery. Specifically, it is preferred that the thickness of the substrate 2 is in the range of 5 μm or more to 20 μm or less.

From the perspective of ion permeability, it is preferred that the porosity of the substrate 2 is 25% or more to 70% or less. However, if nonwoven cloth is used as the substrate 2, it is preferred that the porosity is 50% or more to 90% or less. During actual use of the battery, although the current value depends on properties such as the structure of the substrate 2 and the thickness, if the porosity is 25% or more, the mobility of the ions involved in charging and discharging in the electrolyte solution is improved. Namely, not only are the load characteristics improved, but it tends to be easier to extract a sufficient capacity during large current discharge. On the other hand, if the porosity is 70% or less, this tends to allow the separator strength to be improved.

(Surface Layer)

It is preferred that the surface layer 3 is a porous film having a lot of pores in order to obtain the ion permeation function and the electrolyte solution retention function of the separator 1. The surface layer 3 includes inorganic particles and a resin material as main components. The inorganic particles form a three-dimensional agglomeration structure in the surface layer 3. This agglomeration structure is an agglomeration network structure of inorganic particles. Here, the term agglomeration network structure refers to a porous structure in which agglomerations of inorganic particles are interlinked by cross-linking among the inorganic particles, and pores are formed that have an average pore size greater than the average particle size of the inorganic particles. The agglomerations are linked by a cross-linking moiety that has a long, thin shape like a chain or the like. This cross-linking moiety is formed by the inorganic particles agglomerating and growing, for example.

The agglomeration network structure of the surface layer 3 is a structure that can be made to crumple by applying pressure. Consequently, when the separator 1 is included in a battery, electrode expansion can be absorbed from the crumpling of the surface layer 3 of the separator 1 that occurs with the expansion of the electrode.

The content of the inorganic particles based on the total amount of the resin material and the inorganic particles is preferably in the range of 70% by mass or more, more preferably 70% by mass or more to 98% by mass or less, and even more preferably 80% by mass or more to 98% by mass or less. If the content of the inorganic particles is 70% by mass or more, the difference in the pore size and the porosity between the surface layer 3 having an agglomeration network structure and a surface layer not having an agglomeration network structure becomes obvious. Here, the term surface layer not having an agglomeration network structure means a surface layer packed with inorganic particles, with pores being formed in the layer by gaps among those inorganic particles. On the other hand, if the content of the inorganic particles is 98% by mass or less, the resin material amount supporting the inorganic particles tends to be sufficient, and the fixing of the surface layer 3 to the substrate 2 tends to be easy.

The average pore size of the surface layer 3, which is greater than the average particle size of the inorganic particles, is preferably not greater than 20-times the average particle size of the inorganic particles, and more preferably is 5.6-times or more greater to not more than 10.0-times greater the average particle size of the inorganic particles. More specifically, the average pore size of the surface layer 3 is preferably in the range of more than 0.5 μm to 10 μm or less, and more preferably 2.8 μm or more to 5.0 μm or less. If the average pore size is greater than the average particle size of the inorganic particles, the power density of a battery that includes the separator 1 tends to be improved. On the other hand, if the average pore size is not more than 20-times the average particle size of the inorganic particles, after compression of the surface layer 3, the pores formed by agglomeration are filled in by the surrounding inorganic particles. This tends to enable the inorganic particles to be uniformly fixed on the substrate 2, and consequently, greater advantageous effects such as oxidation resistance and mechanical strength to be conferred.

The porosity of the surface layer 3 is preferably in the range of 74% or more to 90% or less. If the porosity is 74% or more, the power density of a battery that includes the separator 1 tends to be improved. On the other hand, if the porosity is 90% or less, this tends to enable the distance between the electrodes to be maintained without the surface layer 3 crumpling even if stress is applied during battery fabrication.

It is preferred to use inorganic particles having an electrical insulating property as the inorganic particles. As inorganic particles having such a property, ceramic particles having a ceramic material as a main component can be used. Examples of ceramic materials that can be used include a metal oxide, a metal nitride, a metal carbide, or a metal sulfide. Examples of metal oxides that can be used include aluminum oxide (alumina, $Al_2O_3$), hydrated aluminum oxide (boehmite), aluminum hydroxide, magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$) and the like. Examples of metal nitrides that can be used include silicon nitride ($Si_3N_4$), aluminum nitride (AlN), boron nitride (BN), titanium nitride and the like. Examples of metal carbides that can be used include silicon carbide (SiC), boron carbide ($B_4C$) or the like. Examples of metal sulfides that can be used include barium sulfate ($BaSO_4$) and the like. Further, it is also possible to uses minerals, such as porous aluminosilicates like zeolite ($M_{2/n}O \cdot Al_2O_3 \cdot xSiO_2 \cdot yH_2O$, wherein M represents a metal element, $x \geq 2$, $y \geq 0$) and the like, layered silicates, barium titanate ($BaTiO_3$), or strontium titanate ($SrTiO_3$). Among these, it is preferred to use alumina, titania (especially titania having a rutile structure), silica, or magnesia, and it is more preferred to use alumina.

These ceramic materials can be used alone or as a mixture of two or more thereof. Further, the inorganic particles can also be used alone or as a mixture of two or more thereof. It is preferred that the inorganic particles have oxidation resistance. Especially, it is preferred that the surface layer 3 provided on the face opposing the positive electrode includes inorganic particles having oxidation resistance. This is to enable a separator 1 to be obtained that has a strong resistance to the oxidative environment near the positive electrode during charging.

Examples of the shape of the inorganic particles include, but are not limited to, spherical, ellipsoidal, needle-shaped, plate-shaped, scale-shaped, tubular, wire-shaped, rod-like (rod-shaped), irregular and the like. Two or more kinds of particles having the above-described shapes may be used in combination. Here, the term spherical is not limited to a perfect sphere, this term includes shapes that are slightly flattened or deformed from a perfect sphere, shapes on which uneven portions are formed on the surface of a perfect sphere, shapes that are a combination of these and the like. The term ellipsoidal is not limited to an ellipsoid in a strict mathematical sense, this term includes shapes that are slightly flattened or deformed from a true ellipsoid, shapes on which uneven portions are formed on the surface of a true ellipsoid, shapes that are a combination of these and the like.

From the perspective of the strength and coatability of the separator 1, the average particle size of the inorganic particles is preferably not greater than a few μm. Specifically, the average particle size of the inorganic particles is preferably in the range of 1.0 μm or less, and more preferably 0.3 μm or more to 0.8 μm or less. If the average particle size of the inorganic particles is 0.3 μm or more, this tends to allow the viscosity of the paint to be appropriately maintained and coatability to be obtained. On the other hand, if the average particle size of the inorganic particles is 1.0 μm or less, this tends to enable the flatness and crumpling amount of the surface layer 3 to be obtained.

The resin material is a binder that binds the agglomerated inorganic particles together, and binds and fixes the inorganic particles to the substrate 2. It is preferred that a resin material containing fluorine is used as the resin material. Examples of fluorine-containing resin materials that can be used include fluorine-containing rubbers, such as polyvinylidene fluoride, polytetrafluoroethylene, a vinylidene fluoride/tetrafluoroethylene copolymer, an ethylene/tetrafluoroethylene copolymer and the like. A non fluorine/containing resin material may also be used as the resin material. Examples thereof include rubbers, such as a styrene/butadiene copolymer or a hydride thereof, an acrylonitrile/butadiene copolymer or a hydride thereof, an acrylonitrile/butadiene/styrene copolymer or a hydride thereof, a methacrylate/acrylate copolymer, a styrene/acrylate copolymer, an acrylonitrile/acrylate copolymer, an ethylene propylene rubber, a polyvinyl alcohol, and a polyvinyl acetate, cellulose derivatives such as ethyl cellulose, methyl cellulose, hydroxyethyl cellulose, and carboxymethyl cellulose, a polyphenylene ether, a polysulfone, a polyether sulfone, a polyphenylene sulfide, a polyetherimide, a polyimide, polyimides such as a wholly aromatic polyamide (an aramid), a polyamide-imide, polyacrylonitrile, a polyvinyl alcohol, a polyvinyl ether, a polyether, an acrylic resin, or a polyester. These resin materials can be used alone or as a mixture of two or more thereof.

Separator Production Method

FIGS. 2A to 2D are process diagrams illustrating an example of a method for producing a separator according to a first embodiment of the present technology.

Figure 2:
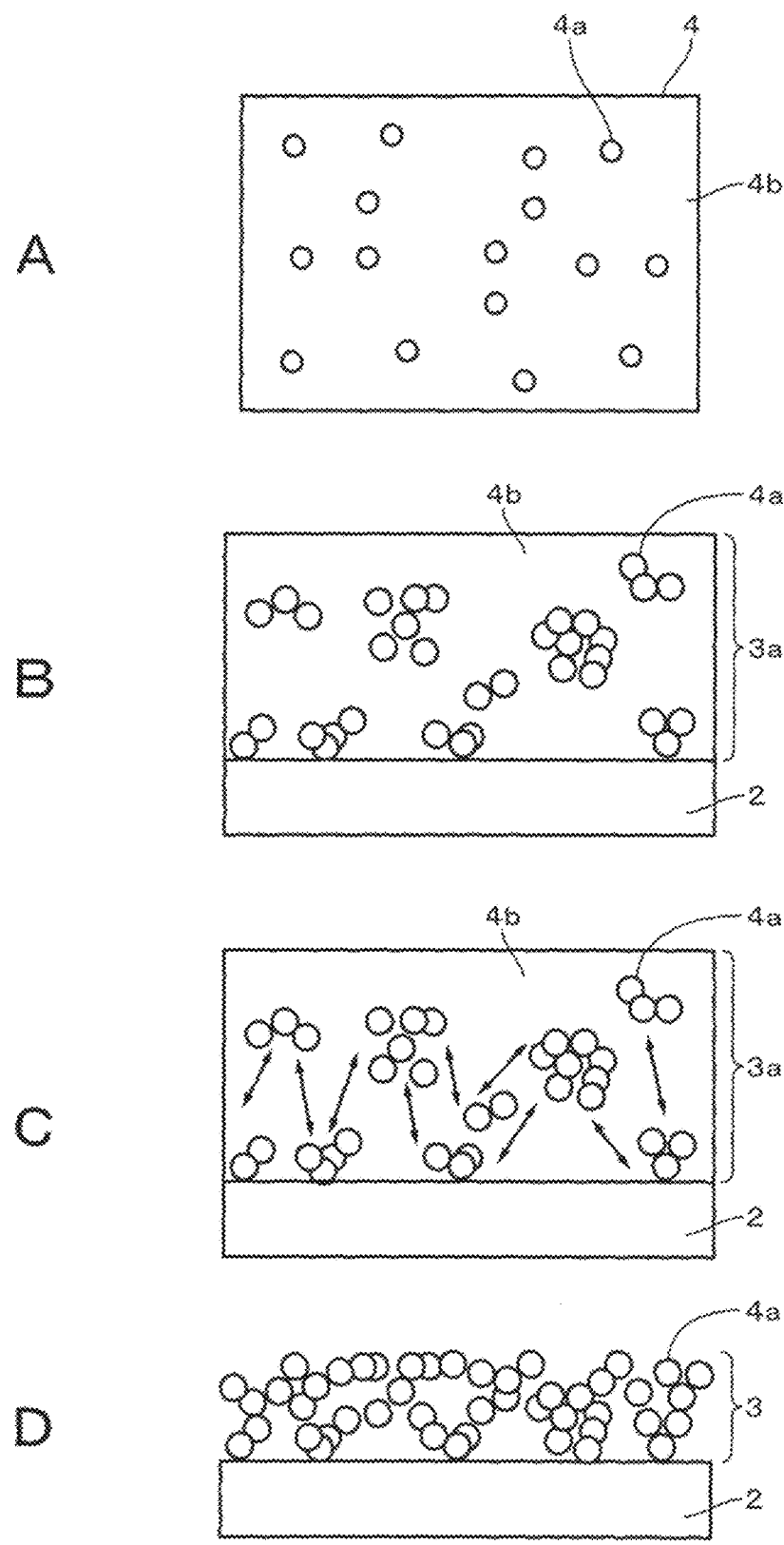
FIGS. 2A to 2D are process diagrams illustrating an example of a method for producing a separator according to a first embodiment of the present technology.

First, as illustrated in FIG. 2A, a resin solution 4 is prepared by mixing a resin material and inorganic particles 4a in a predetermined mixing ratio, adding to a dispersion medium 4b, and dispersing. It is noted that in FIG. 2A an illustration of the resin material is omitted. As the dispersion medium, any kind may be used as long as it can dissolve the resin material. Examples of the dispersion medium include N-methyl-2-pyrrolidone, dimethylacetamide, dimethylformamide, dimethylsulfoxide, toluene, acetonitrile or the like, which can be used alone or as a mixture of two or more thereof. From the perspectives of solubility and a high dispersibility, it is preferred to use N-methyl-2-pyrrolidone (NMP).

Next, a coated film is formed by coating the prepared resin solution 4 on at least one face of the substrate 2. Then, the surface layer 3 is formed on at least one face of the substrate 2 by dipping the substrate 2 on which the coated film was formed in a phase-separating solvent (congealing solution). Next, the formed surface layer 3 is dried. It is preferred to use an alcohol or a mixed solvent thereof as the phase-separating solution. Examples of the alcohol include methanol, ethanol, propanol, butanol, isopropyl alcohol (IPA) and the like, which may be used alone or as a mixture of two or more thereof. It is preferred to use an organic solvent as the solvent mixed with the alcohol. Examples of the organic solvent include N-methyl-2-pyrrolidone (NMP), N,N-dimethylacetamide (DMAc), N,N-dimethylformamide (DMF), acetone and the like, which may be used alone or as a mixture of two or more thereof.

During the above-described dipping process, the surface layer is specifically formed as follows. First, as illustrated in FIG. 2B, agglomerations are formed by the inorganic particles 4a agglomerating in a coated film 3a. Next, as illustrated in FIG. 2C, the agglomerations of inorganic particles 4a grow while the inorganic particles 4a form networks by cross-linking to each other, so that an agglomeration network structure is formed. Then, as illustrated in FIG. 2D, while maintaining this agglomeration network structure, the inorganic particles 4a are fixed to the substrate 2. It is noted that in FIGS. 2B to 2D illustration of the resin material is omitted.

In this manner, the intended separator 1 is obtained.

Effects

According to the first embodiment, the separator 1 includes the substrate 2, which is a first layer, and the surface layer 3, which is a second layer, provided on at least one face of the substrate 2. Further, the surface layer 3 has an agglomeration network structure of inorganic particles. Therefore, a large pore size and a high porosity can be obtained. When the separator 1 having such a structure is applied in a battery, the load characteristics of the battery can be improved.

Since the pores are formed by an agglomeration network structure of inorganic particles, the surface layer 3 has a configuration that allows it to crumple by applying pressure. Therefore, when the separator 1 having such a configuration is included in a battery, electrode expansion can be absorbed by the separator 1 as a result of the surface layer 3 of the separator 1 being made to crumple due to the electrode expansion. Further, since the pores of the surface layer 3 are large, even after the surface layer 3 has crumpled the separator 1 can still function as a separator through which ions, such as lithium ions, can pass. In addition, as described above, since the surface layer 3 has a large pore size and a high porosity, the crumpling amount can be ensured. Namely, the surface layer 3 has an excellent compressibility.

If an alloy-based negative electrode is used for the negative electrode, expansion of the alloy-based negative electrode is absorbed by the surface layer 3 of the separator 1, which allows damage and fracturing of the negative electrode to be suppressed. Further, battery properties, such as cycling characteristics and power characteristics, can also be improved.

Since the surface layer 3 of the separator 1 includes inorganic particles, the heat resistance and the oxidation resistance of the separator 1 can be improved. Further, since the surface layer 3 has a porous structure, the infusion properties and the retention properties of the electrolyte solution can be improved, and the surface layer 3 can function as a supply source of the electrolyte solution during electrode expansion.

By causing the inorganic particles to form an agglomeration network structure during phase separation, even when the content of the inorganic particles is in a range of 80% or more, the surface layer 3 can be formed having a high porosity and a large pore size. It is noted that it was difficult in the past to form the surface layer 3 with a high porosity and a large pore size. For example, when the present inventors attempted the method described in Patent Literature 1 with an inorganic particle content in a range exceeding 80% in an experiment, agglomeration and an increase in pore size of the inorganic particles could not be not confirmed.

Although the details about why a surface layer 3 having a high porosity and a large pore size can be obtained in the present technology are not clear, the following may be the reason. Namely, it is thought that when phase separation is performed with an alcohol, agglomeration of the inorganic particles is caused by attraction among the inorganic particles or interaction with the resin material coated on the inorganic particles, and that the agglomerated inorganic particles form a network. In contrast, previous methods for forming a network structure (three-dimensional network structure) are characterized by utilizing viscoelastic phase separation of the resin material to form a three-dimensional network structure of the resin material. Therefore, the method for forming an agglomeration network structure according to the present technology is fundamentally different from the previous methods for forming a network structure (three-dimensional network structure).

2. Second Embodiment

Battery Configuration

Figure 3:
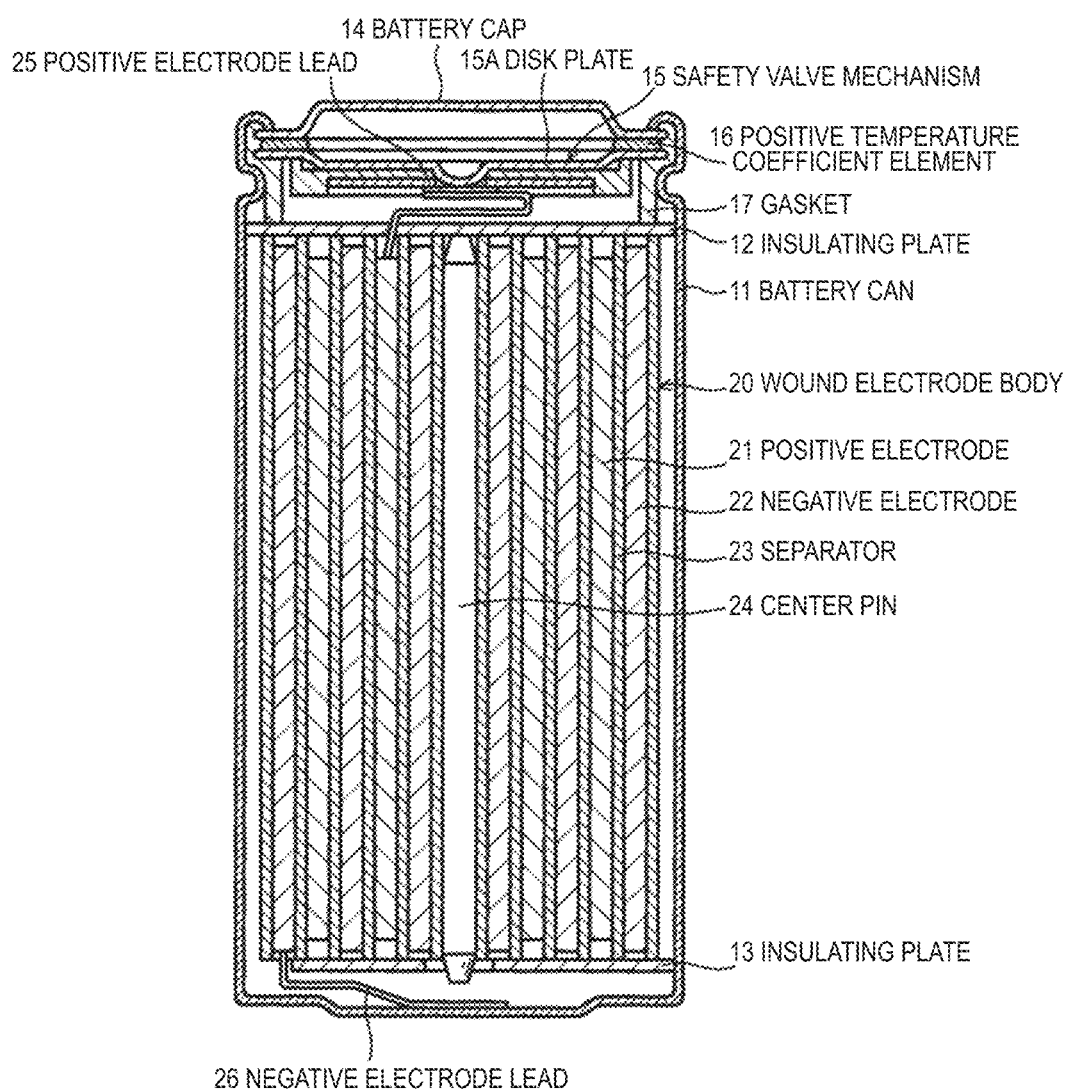
FIG. 3 is a cross-sectional view illustrating a configuration example of a nonaqueous electrolyte secondary battery according to a second embodiment of the present technology.

FIG. 3 is a cross-sectional view illustrating a configuration example of a nonaqueous electrolyte secondary battery according to a second embodiment of the present technology. This nonaqueous electrolyte secondary battery is a so-called lithium ion secondary battery whose negative electrode capacity is represented by a capacity component based on the storage and release of lithium (Li), which is an electrode reactant. This nonaqueous electrolyte secondary battery, which is referred to as a so-called cylindrical type, has a wound electrode body 20 in a generally hollow, columnar-shaped battery can 11, in which a strip-shaped positive electrode 21 and a strip-shaped negative electrode 22 pair are laminated and wound with a separator 23 interposed therebetween. The battery can 11 is formed from nickel (Ni)-plated iron (Fe). One end of the battery can 11 is closed, and the other end is open. An electrolyte solution, which is filled into the battery can 11, is impregnated in the separator 23. Further, a pair of insulating plates 12 and 13 are respectively arranged vertically to the winding periphery so as to sandwich the wound electrode body 20.

A battery cap 14, and a safety valve mechanism 15 and a positive temperature coefficient element (PTC element) 16 provided on an inner side of this battery cap 14, are attached to the open end portion of the battery can 11 by caulking via a sealing gasket 17. The interior of the battery can is thus hermetically sealed. The battery cap 14 is formed from, for example, the same material as the battery can 11. The safety valve mechanism 15, which is electrically connected with the battery cap 14, is configured so that the electrical connection between the battery cap 14 and the wound electrode body 20 is cutoff when a disk plate 15A reverses as a result of the internal pressure in the battery reaching a predetermined level or greater due to an internal short circuit or external heating. The sealing gasket 17 is formed from an insulating material, for example, and has asphalt coated on its surface.

A center pin 24, for example, is inserted in the center of the wound electrode body 20. A positive electrode lead 25 formed from aluminum (Al) or the like is connected to the positive electrode 21 of the wound electrode body 20, and a negative electrode lead 26 formed from nickel or the like is connected to the negative electrode 22. The positive electrode lead 25 is electrically connected with the battery cap 14 by being welded to the safety valve mechanism 15. The negative electrode 26 is electrically connected by being welded to the battery can 11.

Figure 4:
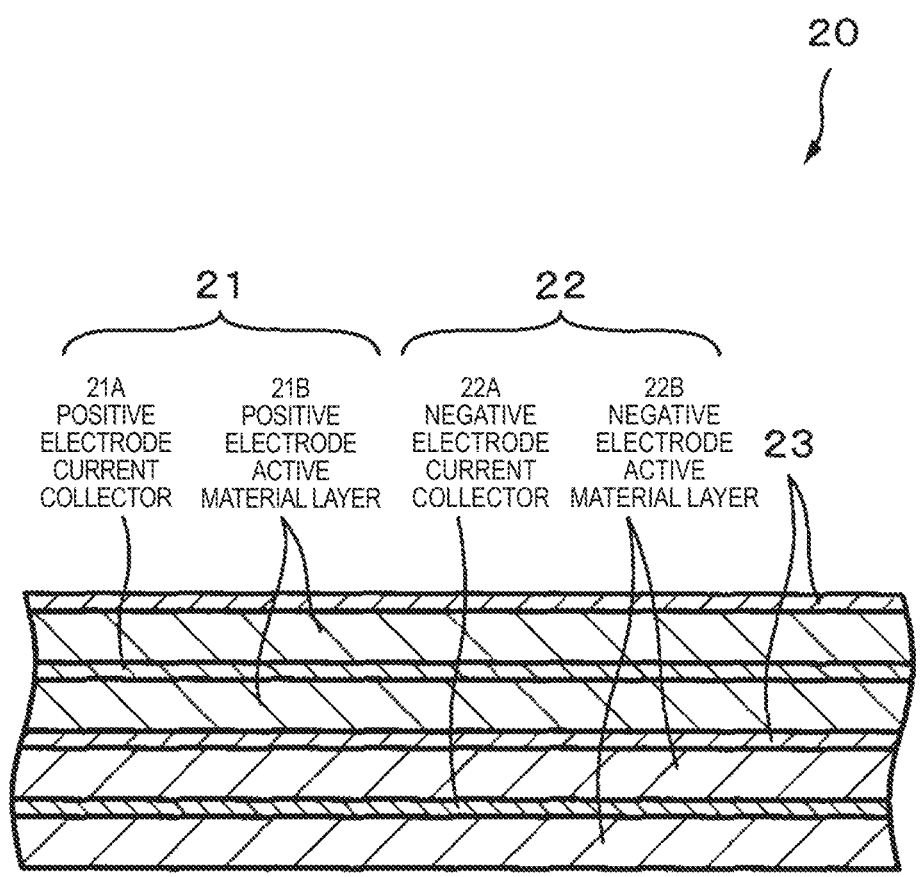
FIG. 4 is an expanded cross-sectional view of a portion of a wound electrode body illustrated in FIG. 3.

FIG. 4 is an expanded cross-sectional view of a portion of the wound electrode body 20 illustrated in FIG. 3. The positive electrode 21, the negative electrode 22, the separator 23, and the electrolyte solution forming the secondary battery will now be described in order with reference to FIG. 4.

(Positive Electrode)

The positive electrode 21 has a structure in which a positive electrode active material layer 21B is provided on both faces of a positive electrode current collector 21A. It is noted that, although not illustrated, the positive electrode active material 21B may also be provided on just one face of the positive electrode current collector 21A. The positive electrode current collector 21A is formed from, for example, metal foil, such aluminum foil. The positive electrode active material 21B includes as a positive electrode active material, for example, one type or two or more types of a positive electrode material capable of intercalating and deintercalating lithium. The positive electrode active material 21B may optionally also include a conducting agent, such as graphite, and a binder, such as polyvinylidene fluoride.

Examples of a suitable positive electrode material capable of intercalating and deintercalating lithium include lithium-containing compounds, such as lithium oxide, lithium phosphorus oxide, lithium sulfide, or an intercalation compound containing lithium. Two or more of these may be mixed and used. To increase the energy density, a lithium-containing compound including lithium, a transition metal element, and oxygen (O) is preferred. Examples of such a lithium-containing compound include a lithium composite oxide having the layered rock-salt type structure represented by formula (A), a lithium complex phosphate having the olivine type structure represented by formula (B) and the like. It is more preferred that the lithium-containing compound is a compound including as a transition metal element at least one element selected from the group consisting of cobalt (Co), nickel (Ni), manganese (Mn), and iron (Fe). Examples of such a lithium-containing compound include a lithium composite oxide having the layered rock-salt type structure represented by formula (C), (D), or (E), a lithium composite oxide having the spinel type structure represented by formula (F), or a lithium complex phosphate having the structure having the olivine type structure represented by formula (G). Specific examples include $LiNi_{0.50}Co_{0.20}Mn_{0.30}O_2$, $Li_aCoO_2$ ($a\approx1$), $Li_bNiO_2$ ($b\approx1$), $Li_{c1}Ni_{c2}Co_{1-c2}O_2$ ($c_1\approx1$, $0<c_2<1$), $Li_dMn_2O_4$ ($d\approx1$), $Li_eFePO_4$ ($e\approx1$) or the like.

$$Li_pNi_{(1-q-r)}Mn_qM1_rO_{(2-y)}X_z \quad (A)$$

(in the formula (A), however, M1 represents at least one of elements selected from 2 to 15 group elements except for nickel (Ni) and manganese (Mn); X represents at least one of 16 and 17 group elements except for oxygen (O); p, q, y, and z are values in ranges of $0\le p\le1.5$, $0\le q\le1.0$, $0\le r\le1.0$, $-0.10\le y\le0.20$, and $0\le z\le0.2$).

$$Li_aM2_bPO_4 \quad (B)$$

(in the formula (B), however, M2 represents at least one of elements selected from 2 to 15 group elements; a and b are values in ranges of $0\le a\le2.0$ and $0.5\le b\le2.0$).

$$Li_jMn_{(1-g-h)}Ni_gM3_hO_{(2-j)}F_k \quad (C)$$

(in the formula (C), however, M3 represents at least one selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); f, g, h, j and k are values in ranges of $0.8\le f\le1.2$, $0<g<0.5$, $0\le h\le0.5$, $g+h<1$, $-0.1\le j\le0.2$, and $0\le k\le0.1$. Note that the composition of lithium differs depending on the state of charge/discharge, and the value of f represents a value in a complete discharge state).

$$Li_mNi_{(1-n)}M4_nO_{(2-p)}F_q \quad (D)$$

(in the formula (D), however, M4 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); m, n, p, and q are values in ranges of $0.8\le m\le1.2$, $0.005\le n\le0.5$, $-0.1\le p\le0.2$, and $0\le q\le0.1$. Note that the composition of lithium differs depending on the state of charge/discharge, and the value of m represents a value in a complete discharge state).

$$Li_rCo_{(1-s)}M5_sO_{(2-t)}F_u \quad (E)$$

(in the formula (E), however, M5 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); r, s, t, and u are values in ranges of $0.8\le r\le1.2$, $0\le s\le0.5$, $-0.1\le t\le0.2$, and $0\le u\le0.1$. Note that the composition of lithium differs depending on the state of charge/discharge, and the value of r represents a value in a complete discharge state).

$$Li_vMn_{2-w}M6_wO_xF_y \quad (F)$$

(in the formula (F), M6 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); v, w, x, and y are values in ranges of $0.9\le v\le1.1$, $0\le w\le0.6$, $3.7\le x\le4.1$, and $0\le y\le0.1$. Note that the composition of lithium differs depending on the state of charge/discharge, and the value of v represents a value in a complete discharge state).

$$Li_zM7PO_4 \quad (G)$$

(in the formula (G), however, M7 represents at least one selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr); z is a value in ranges of $0.9\le z\le1.1$. Note that the composition of lithium differs depending on the state of charge/discharge, and the value of z represents a value in a complete discharge state).

In addition to these, further examples of the positive electrode material capable of intercalating and deintercalating lithium include inorganic compounds that do not include lithium, such as $MnO_2$, $V_2O_5$, $V_6O_{13}$, NiS, MoS and the like.

The positive electrode material capable of intercalating and deintercalating lithium may be a material other than those described above. Further, two or more of the above-exemplified positive electrode materials may be mixed in an arbitrary combination.

(Negative Electrode)

The negative electrode 22 has a structure in which a negative electrode active material layer 22B is provided on both faces of a negative electrode current collector 22A. It is noted that, although not illustrated, the negative electrode active material 22B may also be provided on just one face of the negative electrode current collector 22A. The negative electrode current collector 22A is formed from, for example, metal foil, such copper foil.

The negative electrode active material 22B includes as a negative electrode active material, for example, one type or two or more types of a negative electrode material capable of intercalating and deintercalating lithium. The negative electrode active material 22B may optionally also be formed including the same binder as the positive electrode 21B.

It is noted that in this secondary battery the electrochemical equivalent of the negative electrode material capable of intercalating and deintercalating lithium is greater than the electrochemical equivalent of the positive electrode 21, so that lithium metal does not precipitate on the negative electrode 22 during charging.

Examples of the negative electrode material capable of intercalating and deintercalating lithium include carbon materials such as non-graphitizable carbon, graphitizable carbon, graphite, pyrocarbons, cokes, glassy carbons, an organic polymeric material burned substance, carbon fiber, activated carbon or the like. Among these, examples of cokes include pitch coke, needle coke, petroleum coke or the like. The organic polymeric material burned substance refers to a carbonized material obtained by baking a polymer material such as a phenol resin or a furan resin at an appropriate temperature. Some of such carbonized materials are classified as non-graphitizable carbon or graphitizable carbon. Further, examples of the polymer material include polyacetylene or polypyrrole. These carbon materials are preferred because they exhibit very little change in their crystal structure during charging and discharging, a high charge/discharge capacity can be obtained, and excellent cycling characteristics can be obtained. Graphite is especially preferred, as it has a large electrochemical equivalent and a high energy density can be obtained. Further, non-graphitizable carbon is preferable because excellent characteristics can be obtained. Furthermore, it is preferable to use a carbon material having a low charge/discharge potential, i.e., a charge/discharge potential that is close to that of lithium metal, because the a higher energy density can be realized for the battery easily.

Examples of the negative electrode material capable of intercalating and deintercalating lithium further include materials capable of intercalating and deintercalating lithium and including one kind of element selected from among metal elements and semi-metal elements as a constituent element. Here, the negative electrode 22 including such a negative electrode material will be referred to as an alloy-based negative electrode. This is because a high energy density can be obtained with use of such a material. It is especially preferred to use together with a carbon material because this enables a high energy density as well as excellent cycling characteristics to be obtained. This negative electrode material may be a simple substance, an alloy, or a compound of the metal element or the semi-metal element, or may contain, at least partly, a phase of one or more of the simple substance, alloy, or compound of the metal element or the semi-metal element. Note that in the present technology, the term alloy includes, in addition to materials formed from two or more kinds of metal element, materials containing one or more kinds of metal element and one or more kinds of semi-metal element. Further, the alloy may contain a non-metal element. Examples of the compositional structure include a solid solution, a eutectic (eutectic mixture), an intermetallic compound, or a material in which two or more kinds thereof coexist.

Examples of the metal element or semi-metal element contained in this negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

It is preferable to use, as the negative electrode material, a material containing, as a constituent element, a metal element or a semi-metal element of 4B group in the short periodical table. It is more preferable to use a material containing at least one of silicon (Si) and tin (Sn) as a constituent element. This is because silicon (Si) and tin (Sn) each have a high capability of intercalating and deintercalating lithium, so that a high energy density can be obtained.

Examples of the alloy of tin (Sn) include alloys containing, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of silicon (Si) include alloys containing, as a second constituent element other than silicon (Si), at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds containing oxygen (O) or carbon (C), which may contain any of the above-described second constituent elements in addition to tin (Sn) or silicon (Si).

Further examples of the negative electrode material capable of intercalating and deintercalating lithium include other metal compounds or polymer materials. Examples of other metal compounds include oxides such as $MnO_2$, $V_2O_5$, and $V_6O_{13}$, sulfides such as NiS and MoS, or lithium nitrides such as $LiN_3$. Examples of polymer materials include polyacetylene, polyaniline, polypyrrole and the like.

(Separator)

The separator 23 separates the positive electrode 21 and the negative electrode and allows the lithium ions to pass through while preventing current short circuiting caused by contact between the two electrodes. As the separator 23, the separator 1 according to the above-described first embodiment may be used.

(Electrolyte Solution)

An electrolyte solution, which is a liquid electrolyte, is impregnated in the separator 23. This electrolyte solution includes a solvent and an electrolyte salt dissolved in this solvent.

As the solvent, a cyclic carbonate, such as ethylene carbonate or propylene carbonate may be used. It is preferred to use one of ethylene carbonate and propylene carbonate, and especially to use a mixture of both of these. This is because it is possible to improve the cycling characteristics.

Further, as the solvent, in addition to these cyclic carbonates, it is preferred to use a mixture of linear carbonates, such as diethyl carbonate, dimethyl carbonate, ethyl methyl carbonate, or methyl propyl carbonate. This is because a high ion conductivity can be obtained.

Even further, as the solvent, it is preferred to include 2,4-difluoroanisole or vinylene carbonate. This is because 2,4-difluoroanisole can improve the discharge capacity, and vinylene carbonate can improve the cycling characteristics. Therefore, if a mixture of these is used, the discharge capacity and the cycling characteristics can be improved.

Besides these, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-imidazolidinone, nitromethane, nitroethane, sulfolane, dimethyl sulfoxide, trimethyl phosphate or the like.

It is noted that since a compound in which at least a part of the hydrogens in these non-aqueous solvents has been substituted with fluorine may, depending on the type of combined electrode, improve the electrode reaction reversibility, such a compound is in some cases preferred.

Examples of the electrolyte salt include a lithium salt, which can be used alone or as a mixture of two types or more thereof. Examples of lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)$, $LiAlCl_4$, $LiSiF_6$, LiCl, lithium difluoro[oxolato-O,O']borate, lithium bisoxalate borate, LiBr or the like. Among these, $LiPF_6$ is preferred, because a high ion conductivity can be obtained and cycling characteristics can be improved.

Battery Fabrication Method

Next, an example of a method for fabricating the non-aqueous electrolyte secondary battery according to the second embodiment of the present technology will be described.

First, for example, a positive electrode mixture is prepared by mixing a positive electrode active material, a conducting agent, and a binder. This positive electrode mixture is dispersed in a solvent, such as N-methyl-2-pyrrolidone, to produce a paste-like positive electrode mixture slurry. Next, the positive electrode 21 is formed by coating this positive electrode mixture slurry on the positive electrode current collector 21A, drying, and compression-molding with a roll press or the like to form the positive electrode active material layer 21B.

Further, for example, a negative electrode mixture is prepared by mixing a negative electrode active material and a binder. This negative electrode mixture is dispersed in a solvent, such as N-methyl-2-pyrrolidone, to produce a paste-like negative electrode mixture slurry. Next, the negative electrode 22 is produced by coating this negative electrode mixture slurry on the negative electrode current collector 22A, drying, and compression-molding with a roll press or the like to form the negative electrode active material layer 22B.

Next, the positive electrode lead 25 is attached to the positive electrode current collector 21A by welding or the like, and the negative electrode lead 26 is attached to the negative electrode current collector 22A by welding or the like. After that, the positive electrode 21 and the negative electrode 22 are wound with the separator 23 interposed therebetween. Next, a tip end of the positive electrode lead 25 is welded to the safety valve mechanism 15, a tip end of the negative electrode lead 26 is welded to the battery can 11, and the wound positive electrode 21 and negative electrode 22 are sandwiched by a pair of insulating plates 12 and 13 and housed inside the battery can 11. Then, after the positive electrode 21 and the negative electrode 22 are housed inside the battery can 11, a phosphorous compound-containing electrolyte solution is injected into the battery can 11 and impregnated into the separator 23. Next, the battery cap 14, the safety valve mechanism 15, and the positive temperature coefficient element 16 are fixed to the open end portion of the battery can 11 by caulking via the sealing gasket 17. In this manner, the secondary battery illustrated in FIG. 3 is obtained.

Effects

In the nonaqueous electrolyte secondary battery according to the second embodiment, since the separator 23 includes the surface layer 3 on at least one face of the substrate 2, and the surface layer 3 has an agglomeration network structure, a high power density can be obtained.

Since the surface layer 3 of the separator 23 has a configuration that can be made to crumple by applying pressure, electrode expansion of at least one of the positive electrode 21 and the negative electrode 22 can be absorbed. For example, when an alloy-based negative electrode is used as the negative electrode 22, expansion of the alloy-based negative electrode can be absorbed, so that damage and fracturing of the negative electrode 22 can be suppressed. Further, battery properties, such as cycling characteristics and power characteristics, can be improved.

Third Embodiment

Battery Configuration

Figure 5:
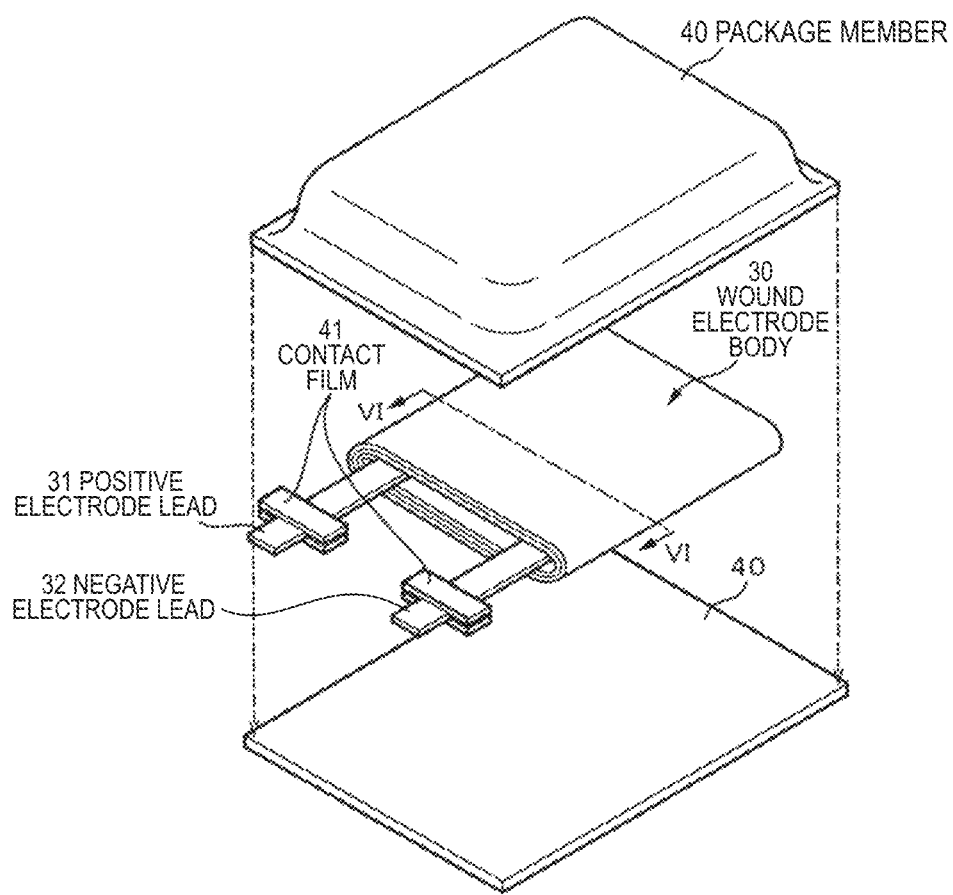
FIG. 5 is an exploded perspective view illustrating a configuration example of a nonaqueous electrolyte secondary battery according to a third embodiment of the present technology.

FIG. 5 is an exploded perspective view illustrating a configuration example of a nonaqueous electrolyte secondary battery according to a third embodiment of the present technology. This secondary battery houses a wound electrode body 30 to which a positive electrode lead 31 and a negative electrode lead 32 are attached inside a film-shaped package member 40, so that a smaller, lighter, and thinner battery can be obtained.

Each of the positive electrode lead 31 and the negative electrode lead 32 is led out from the inside of the hermetically package member 40 toward the outside in the same direction, for example. The positive electrode lead 31 and the negative electrode lead 32 are each formed using, for example, a metal material such as aluminum, copper, nickel, or stainless steel, in a thin plate state or a network state.

The package member 40 is formed from, for example, a rectangular-shaped aluminum laminate film in which a nylon film, aluminum foil, and a polyethylene film are laminated in that order. The package member 40 is arranged so that, for example, the polyethylene film side and the wound electrode body 30 oppose each other, in which the respective peripheral portions are fused together or adhered to each other with an adhesive. A contact film 41 for preventing the entry of external air is inserted between the package member 40 and the positive electrode lead 31 and negative electrode lead 32. The contact film 41 is formed from a material having adhesive properties to the positive electrode lead 31 and the negative electrode lead 32, for example, a polyolefin resin such as polyethylene, polypropylene, modified polyethylene or modified polypropylene.

It is noted that instead of the above-described aluminum laminate film, the package member 40 may also be formed from a laminate film having another structure, a polymer film of polypropylene and the like, or a metal film.

Figure 6:
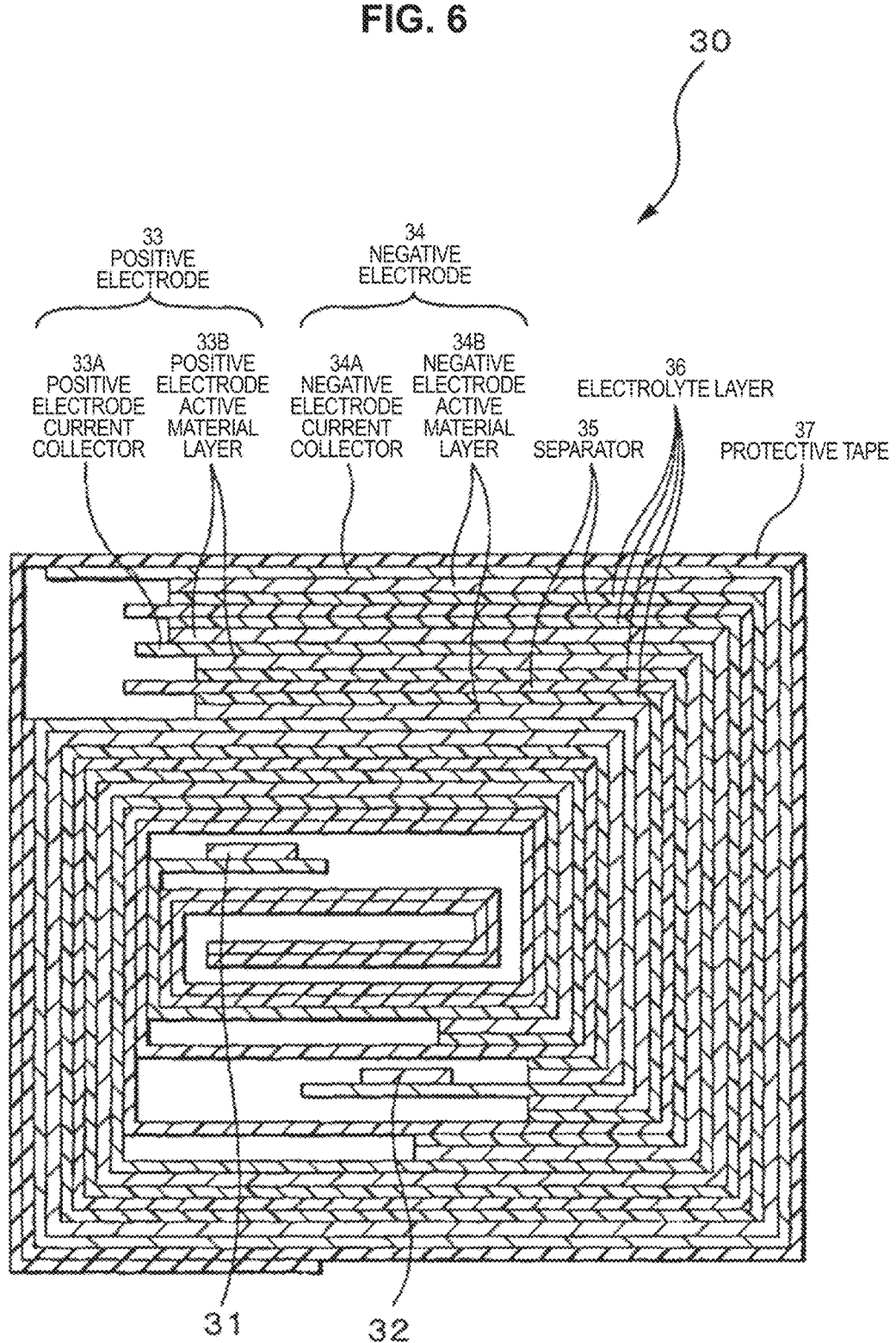
FIG. 6 is a cross-sectional view along the line VI-VI of a wound electrode body illustrated in FIG. 5.

FIG. 6 is a cross-sectional view along the line IV-IV of the wound electrode body 30 illustrated in FIG. 5. The wound electrode body 30 is formed by laminating and winding a positive electrode 33 and a negative electrode 34 with a separator 35 and an electrolyte layer 36 interposed therebetween. The outermost peripheral portion is protected by protective tape 37.

The positive electrode 33 has a configuration in which a positive electrode active material layer 33B is provided on one face or both faces of a positive electrode current collector 33A. The negative electrode 34 has a configuration in which a negative electrode active material layer 34B is provided on one face or both faces of a negative electrode current collector 34A. The negative electrode active material layer 34B and the positive electrode active material layer 33B are arranged opposing each other. The configuration of the positive electrode current collector 33A, the positive electrode active material layer 33B, the negative electrode current collector 34A, and the negative electrode active material layer 34B is the same as the positive electrode current collector 21A, the positive electrode active material layer 21B, the negative electrode current collector 22A, and the negative electrode active material layer 22B according to the second embodiment, respectively. The configuration of the separator 35 is the same as the separator 1 according to the above-described first embodiment.

The electrolyte layer 36, which includes a phosphorous-containing electrolyte solution and a polymer compound serving as a carrier that retains this electrolyte solution, is in a so-called gel state. This gel-like electrolyte layer 36 is preferred, because not only can a high ion conductivity be obtained, but leakage from the battery can be prevented. The composition of the electrolyte solution (i.e., the solvent, electrolyte salt, phosphorous compound) is the same as the secondary battery according to the second embodiment. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, polycarbonate or the like. Especially, from the perspective of electrochemical stability, polyacrylonitrile, polyvinylidene fluoride, polyhexafluoropropylene, or polyethylene oxide or is preferred.

Battery Fabrication Method

Next, an example of a method for fabricating the nonaqueous electrolyte secondary battery according to the third embodiment of the present technology will be described.

First, a precursor solution including a solvent, an electrolyte salt, a phosphorous compound as an additive, a polymer compound, and a mixed solvent is coated on the positive electrode 33 and the negative electrode 34, respectively, and the mixed solvent is volatilized to form an electrolyte layer 36. Next, the positive electrode lead 31 is attached to an end portion of the positive electrode current collector 33A by welding, and the negative electrode lead 32 is attached to an end portion of the negative electrode current collector 34A by welding. Then, the positive electrode 33 and the negative electrode 34 on which the electrolyte layer 36 is formed are laminated with the separator 35 interposed therebetween to form a laminate, and then the laminate is wound in a longitudinal direction thereof and the protective tape 37 is adhered to an outermost peripheral portion to form the wound electrode body 30. Finally, for example, the wound electrode body 30 is sandwiched between package members 40, and the outer edge portions of the package members 40 are adhered to each other and sealed by thermal fusion bonding. At that stage, the contact film 41 is inserted between the positive electrode lead 31 and negative electrode lead 32 and the package member 40. In this manner, the secondary battery illustrated in FIGS. 5 and 6 is obtained.

Alternatively, the secondary battery may be fabricated as follows. First, the positive electrode 33 and the negative electrode 34 are formed in the manner described above, and the positive electrode lead 31 and the negative electrode lead 32 are attached to the positive electrode 33 and the negative electrode 34. Next, the positive electrode 33 and the negative electrode 34 are laminated and wound with the separator 35 interposed therebetween, and the protective tape 37 is adhered to an outermost peripheral portion, thereby forming a wound body that is a precursor of the wound electrode body 30. Then the wound electrode body 30 is sandwiched between package members 40, the outer peripheral portions except for one side are adhered to each other by thermal fusion bonding to make a bag form, and the wound electrode body 30 is housed inside the package member 40. Next, an electrolyte composition including a solvent, an electrolyte salt, a phosphorous compound as an additive, a monomer as a raw material of a polymer compound, a polymerization initiator, and optionally other materials such as a polymerization inhibitor, is prepared, and injected into the package member 40.

Next, after the electrolyte composition has been injected into the package member 40, an open end portion of the package member 40 is sealed by thermal fusion bonding in a vacuum. Then, heat is applied to polymerize the monomer into a polymer compound, thereby forming the gel-like electrolyte layer 36. In this manner, the secondary battery illustrated in FIG. 5 is obtained.

The operation and effects of this nonaqueous electrolyte secondary battery according to the third embodiment are the same as for the nonaqueous electrolyte secondary battery according to the second embodiment.

Fourth Embodiment (Battery Pack Example)

Figure 7:
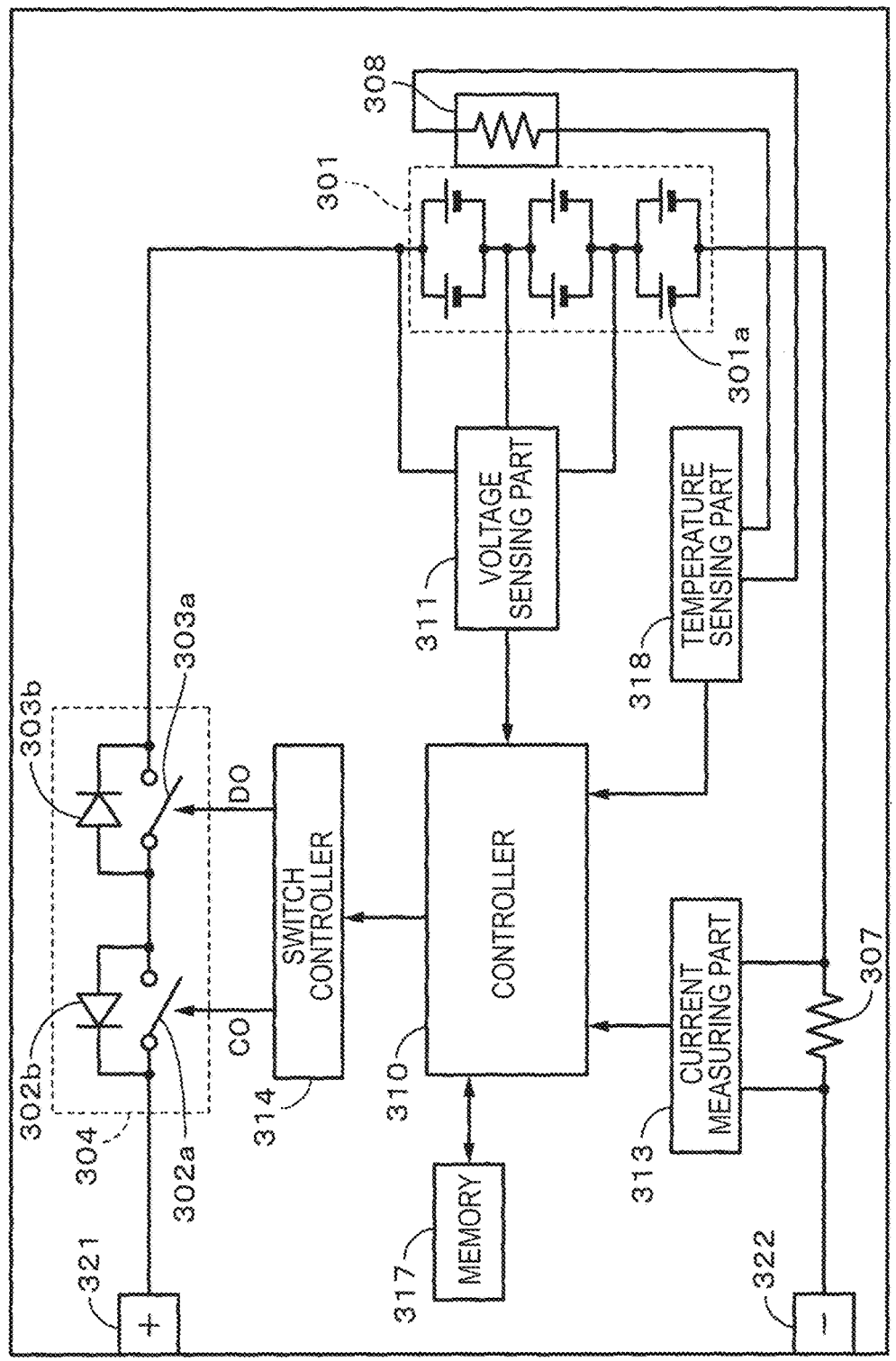
FIG. 7 is a block diagram illustrating a configuration example of a battery pack according to a third embodiment of the present technology.

FIG. 7 is a block diagram illustrating a circuit configuration example for a case in which a battery pack is applied in a nonaqueous electrolyte secondary battery (hereinafter referred to as "secondary battery" as appropriate) according to the present technology. The battery pack includes an assembled battery 301, a package, a switch part 104 including a charge control switch 302a and a discharge control switch 303a, a current sensing resistor 307, a temperature sensing element 308, and a controller 310.

Further, the battery pack includes a positive electrode terminal 321 and a negative electrode terminal 322, and at the time of charge, the positive electrode terminal 321 and the negative electrode terminal 322 are connected to a positive electrode terminal and a negative electrode terminal of a battery charger, respectively, and charge is performed. Further, at the time of using an electronic device, the positive electrode terminal 321 and the negative electrode terminal 322 are connected to a positive electrode terminal and a negative electrode terminal of the electronic device, respectively, and discharge is performed.

The assembled battery 301 is formed by connecting a plurality of secondary batteries 301a in series and/or in parallel. Each of the secondary batteries 301a is the secondary battery according to an embodiment of the present disclosure. Note that although FIG. 7 shows an example in which six secondary batteries 301a are connected so as to have two parallel connections and three series connections (2P3S), any other connection can be adopted such as n parallel and m series (n and m are integers) connections.

The switch part 304 includes the charge control switch 302a, a diode 302b, the discharge control switch 303a, and a diode 303b, and is controlled by the controller 310. The diode 302b has a polarity that is reverse to charge current flowing in the direction from the positive electrode terminal 321 to the assembled battery 301 and forward to discharge current flowing in the direction from the negative electrode terminal 322 to the assembled battery 301. The diode 303b has a polarity that is forward to the charge current and reverse to the discharge current. Note that although an example is shown in which the switch part 304 is provided on a plus side, the switch part may be provided on a minus side.

The charge control switch 302a is turned off when the battery voltage is an overcharge detection voltage and is controlled by a charge/discharge controller so that charge current does not flow into a current path of the assembled battery 301. After the charge control switch 302a is turned off, only discharge is possible via the diode 302b. Further, when overcurrent flows during charge, the charge control switch 302a is turned off and controlled by the controller 310 so that charge current flowing in the current path of the assembled battery 301 is cut off.

The discharge control switch 303a is turned off when the battery voltage is an overdischarge detection voltage and is controlled by the controller 310 so that discharge current does not flow into the current path of the assembled battery 301. After the discharge control switch 303a is turned off, only charge is possible via the diode 303b. Further, when overcurrent flows during discharge, the discharge control switch 303a is turned off and controlled by the controller 310 so that discharge current flowing in the current path of the assembled battery 301 is cut off.

The temperature sensing element 308 is a thermistor for example, and is provided near the assembled battery 301, measures the temperature of the assembled battery 301, and supplies the measured temperature to the controller 310. A voltage sensing part 311 measures the voltage of the assembled battery 301 and of each secondary battery 301a forming the assembled battery 301, A/D converts the measured voltage, and supplies the voltage to the controller 310. A current measuring part 313 measures current with the current sensing resistor 307, and supplies the measured current to the controller 310.

A switch controller 314 controls the charge control switch 302a and the discharge control switch 303a of the switch part 304, based on the voltage and current input from the voltage sensing part 311 and the current measuring part 313. When the voltage of any of the secondary batteries 301a is the overcharge detection voltage or lower or the overdischarge detection voltage or lower, or when overcurrent flows rapidly, the switch controller 314 transmits a control signal to the switch part 304 to prevent overcharge, overdischarge, and overcurrent charge/discharge.

Here, for example, if the secondary battery 301a is a lithium ion secondary battery, the overcharge detection voltage is set at, for example, 4.20±0.05 V, and the overdischarge detection voltage is set at, for example, 2.4±0.1 V.

As a charge/discharge switch, for example, a semiconductor switch such as a MOSFET can be used. In this case, a parasitic diode of the MOSFET serves as the diodes 302b and 303b. In a case where a p-channel FET is used as the charge/discharge switch, the switch controller 314 supplies a control signal DO and a control signal CO to a gate of the charge control switch 302a and a gate of the discharge control switch 303a, respectively. In the case of the p-channel type, the charge control switch 302a and the discharge control switch 303a are turned on at a gate potential which is lower than a source potential by a predetermined value or more. That is, in normal charge and discharge operations, the charge control switch 302a and the discharge control switch 303a are made to be in an ON state by setting the control signals CO and DO to low levels.

Further, when performing overcharge or overdischarge, for example, the charge control switch 302a and the discharge control switch 303a are made to be in an OFF state by setting the control signals CO and DO to high levels.

A memory 317 is formed of a RAM or ROM, and is formed of an erasable programmable read only memory (EPROM), which is a volatile memory, for example. The memory 317 stores, in advance, the value calculated in the controller 310, the internal resistance value of the battery in an initial state of each of the secondary batteries 301a measured at a stage in a manufacturing process, and the like, which are rewritable as necessary. Further, by storing a full charge capacity of the secondary battery 301a, the memory 317 can calculate the remaining capacity together with the controller 310, for example.

A temperature sensing part 318 measures the temperature with use of the temperature sensing element 308, controls charge/discharge at the time of abnormal heat generation, and corrects the calculation of the remaining capacity.

Fifth Embodiment

The above-described nonaqueous electrolyte secondary battery and a battery pack that uses this can be mounted in or used to supply power to a device, such as an electronic device, an electric vehicle, and a power storage device.

Examples of the electronic device include a laptop personal computer, a PDA (mobile information device), a mobile phone, a cordless extension, a video movie, a digital still camera, an e-book reader, an electronic dictionary, a music player, a radio, a headphone, a game machine, a navigation system, a memory card, a pacemaker, a hearing aid, an electric tool, an electric razor, a refrigerator, an air conditioner, a television set, a stereo, a water heater, a microwave, a dishwasher, a washer, a drier, a lighting device, a toy, a medical device, a robot, a road conditioner, a traffic light, and the like.

Further, examples of the electric vehicle include a railway train, a golf cart, an electric cart, an electric car (including a hybrid car), and the like. Each battery and the battery pack 100 described in any of the second to fifth embodiments can be used as a power source for driving these vehicles or as a supplementary power source.

Examples of the power storage device include a power source for power storage for buildings such as houses or for power generation equipment, and the like.

From the above application examples, the following will show a specific example of a power storage system using the power storage device using the nonaqueous electrolyte secondary battery according to an embodiment of the present disclosure.

This power storage system can have the following structure for example. A first power storage system is a power storage system in which the power storage device is charged with a power generation device which generates power from renewable energy. A second power storage system is a power storage system which includes the power storage device and supplies power to an electronic device connected to the power storage device. A third power storage system is an electronic device which is supplied with power from the power storage device. These power storage systems are each implemented as a system to supply power efficiently in association with an external power supply network.

Further, a fourth power storage system is an electric vehicle including a conversion device which converts power supplied from the power storage device to driving power of a vehicle, and a control device which performs information processing about vehicle control based on information about the power storage device. A fifth power storage system is a power system including a power information transmitting/receiving part which transmits/receives signals to/from other devices via a network, and controls charge/discharge of the power storage device based on information received by the transmitting/receiving part. A sixth power storage system is a power system which enables power supply from the power storage device and power supply to the power storage device from a power generation device or a power network. The following will show the power storage system.

Home Power Storage System as Application Example

Figure 8:
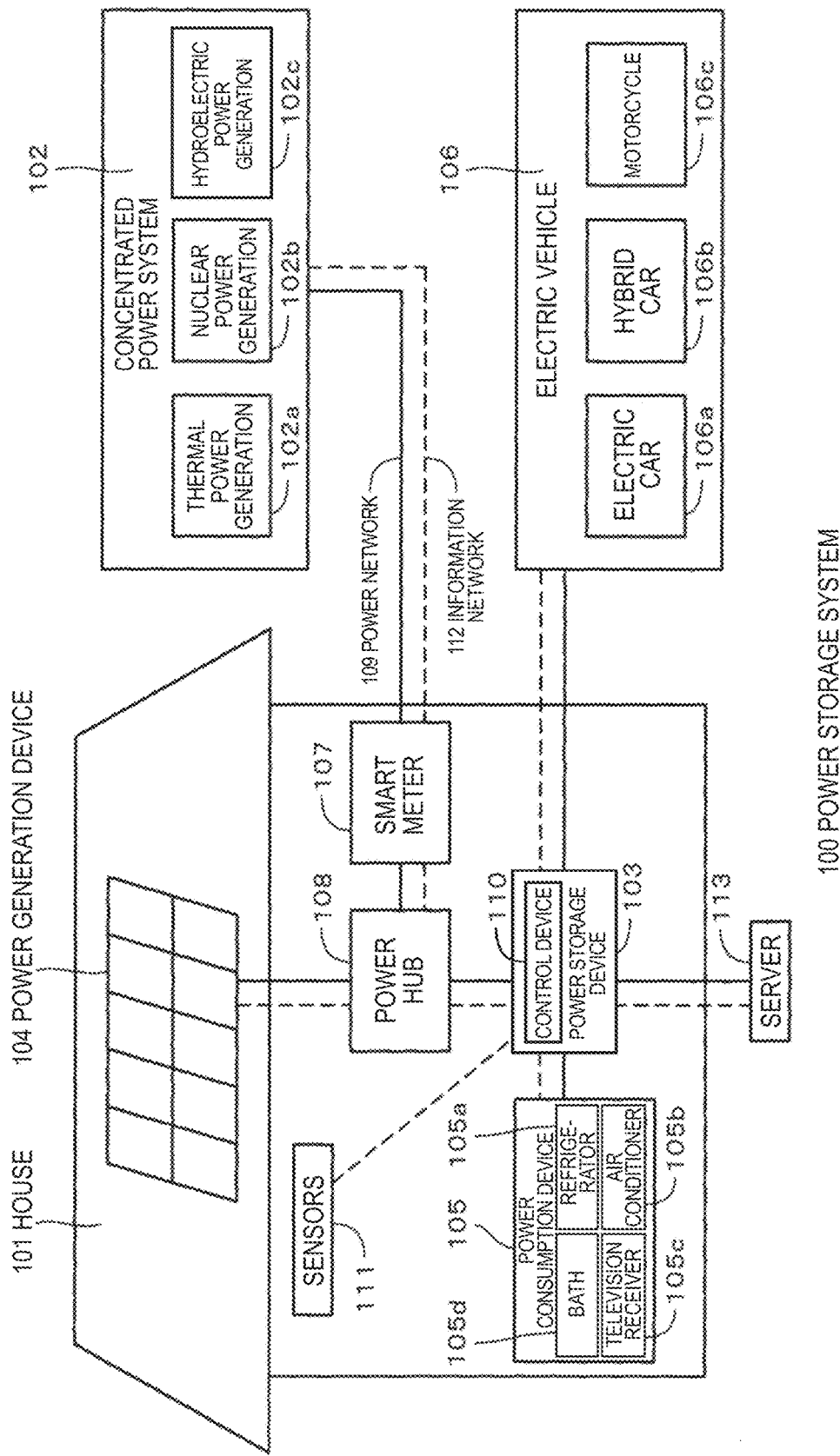
FIG. 8 is a schematic diagram illustrating an example in which a nonaqueous electrolyte secondary battery according to the present technology is applied in a home power storage system.

An example in which the power storage device using the nonaqueous electrolyte secondary battery according to the present disclosure is used for a home power storage system will be described with reference to FIG. 8. For example, in a power storage system 100 for a house 101, power is supplied to the power storage device 103 from a concentrated power system 102 including thermal power generation 102a, nuclear power generation 102b, hydroelectric power generation 102c, and the like, via a power network 109, an information network 112, a smart meter 107, a power hub 108, and the like. Further, power is supplied to the power storage device 103 from an independent power source such as a home power generation device 104. Power supplied to the power storage device 103 is stored, and power to be used in the house 101 is fed with use of the power storage device 103. The same power storage system can be used not only in the house 101 but also in a building.

The house 101 is provided with the power generation device 104, a power consumption device 105, the power storage device 103, a control device 110 which controls each device, the smart meter 107, and sensors 111 which acquires various pieces of information. The devices are connected to each other by the power network 109 and the information network 112. As the power generation device 104, a solar cell, a fuel cell, or the like is used, and generated power is supplied to the power consumption device 105 and/or the power storage device 103. Examples of the power consumption device 105 include a refrigerator 105a, an air conditioner 105b, a television receiver 105c, a bath 105d, and the like. Examples of the power consumption device 105 further include an electric vehicle 106 such as an electric car 106a, a hybrid car 106b, or a motorcycle 106c.

For the power storage device 103, the nonaqueous electrolyte secondary battery according to an embodiment of the present disclosure is used. The nonaqueous electrolyte secondary battery according to an embodiment of the present disclosure may be formed of the above-described lithium ion secondary battery for example. Functions of the smart meter 107 include measuring the used amount of commercial power and transmitting the measured used amount to a power company. The power network 109 may be any one or more of DC power supply, AC power supply, and contactless power supply.

Examples of the various sensors 111 include a motion sensor, an illumination sensor, an object detecting sensor, a power consumption sensor, a vibration sensor, a touch sensor, a temperature sensor, an infrared sensor, and the like. Information acquired by the various sensors 111 is transmitted to the control device 110. With the information from the sensors 111, weather conditions, people conditions, and the like are caught, and the power consumption device 105 is automatically controlled so as to make the energy consumption minimum. Further, the control device 110 can transmit information about the house 101 to an external power company via the Internet, for example.

The power hub 108 performs processes such as branching off power lines and DC/AC conversion. Examples of communication schemes of the information network 112 connected to the control device 110 include a method using a communication interface such as UART (Universal Asynchronous Receiver/Transceiver), and a method using a sensor network according to a wireless communication standard such as Bluetooth, ZigBee, or Wi-Fi. A Bluetooth scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 110 is connected to an external server 113. The server 113 may be managed by any of the house 101, an electric company, and a service provider. Examples of information transmitted and received by the server 113 include power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the PDA (Personal Digital Assistant).

The control device 110 controlling each part is configured with a CPU (Central Processing Unit), a RAM (Random Access Memory), a ROM (Read Only Memory), and the like, and is stored in the power storage device 103 in this example. The control device 110 is connected to the power storage device 103, the home power generation device 104, the power consumption device 105, the various sensors 111, and the server 113 via the information network 112, and has a function of adjusting the used amount of commercial power and the power generation amount, for example. Note that the control device 110 may further have a function of performing power trade in the power market.

As described above, power generated by not only the concentrated power system 102 such as the thermal power generation 102a, the nuclear power generation 102b, and the hydroelectric power generation 102c, but also the home power generation device 104 (solar power generation or wind power generation) can be stored in the power storage device 103. Therefore, even when the power generated by the home power generation device 104 varies, the amount of power supplied to the outside can be constant, or only necessary discharge can be controlled. For example, power generated by the solar power generation can be stored in the power storage device 103 and also inexpensive power at midnight can be stored in the power storage device 103 during nighttime, so that power stored in the power storage device 103 can be discharged and used when the power fee is expensive during daytime.

Note that although this example shows the control device 110 housed in the inside of the power storage device 103, the control device 110 may be housed in the inside of the smart meter 107 or configured independently. Further, the power storage system 100 may be used for a plurality of houses in a multiple dwelling house or a plurality of separate houses.

(Power Storage System in Vehicle as Application Example)

Figure 9:
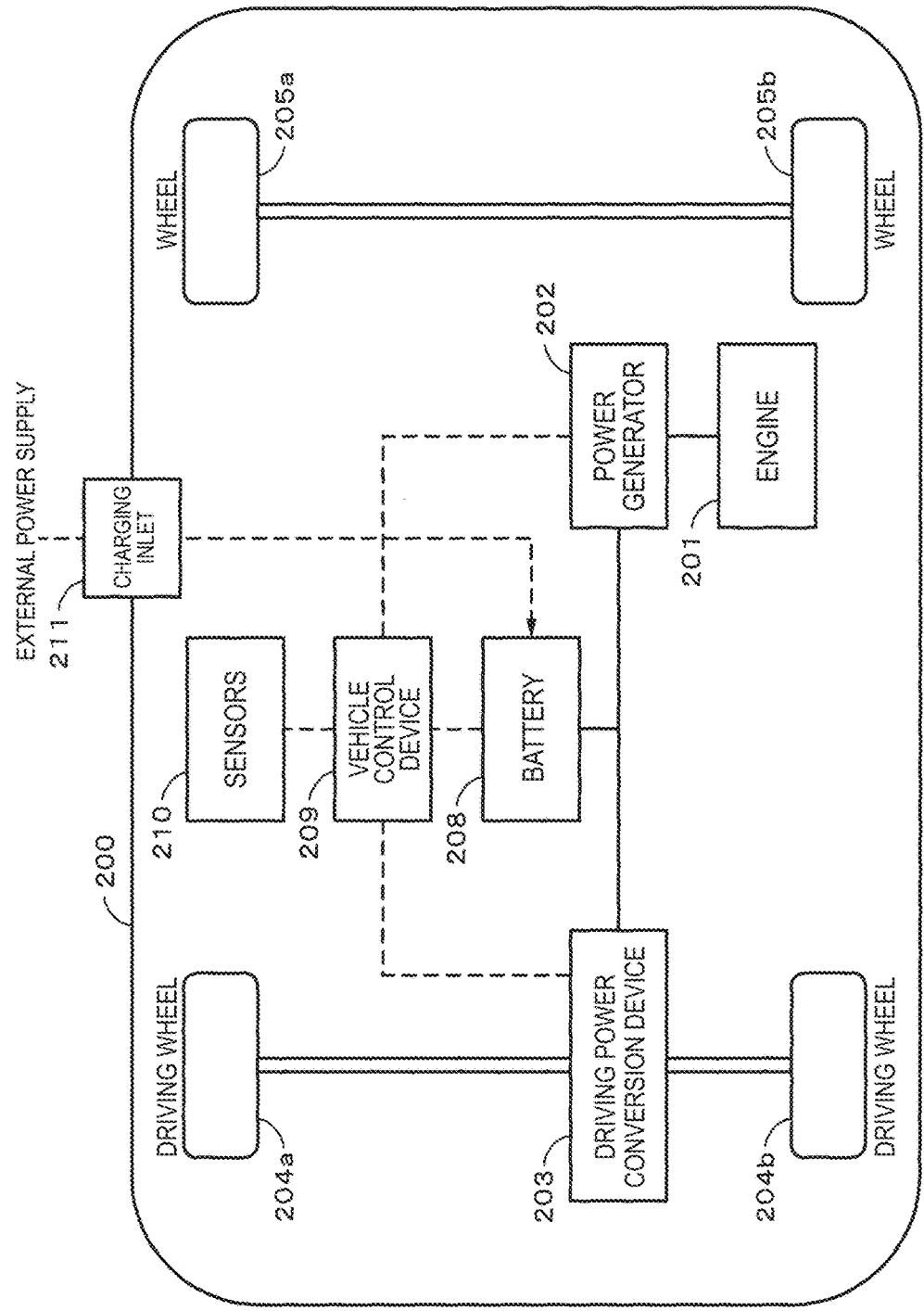
FIG. 9 is a schematic diagram illustrating a configuration example of a hybrid vehicle that employs a series hybrid system in which the present technology is applied.

An example in which an embodiment of the present technology is applied to a power storage system for vehicles will be described with reference to FIG. 9. FIG. 9 schematically shows an example of a structure of a hybrid vehicle employing a series hybrid system to which an embodiment of the present technology is applied. The series hybrid system is a car which runs with a driving power conversion device using power generated by a power generator driven by an engine or power obtained by storing the power in a battery.

A hybrid vehicle 200 incorporates an engine 201, a power generator 202, a driving power conversion device 203, driving wheels 204a and 204b, wheels 205a and 205b, a battery 208, a vehicle control device 209, various sensors 210, and a charging inlet 211. For the battery 208, the nonaqueous electrolyte secondary battery according to the present technology is used.

The hybrid vehicle 200 runs by using the driving power conversion device 203 as a power source. One of examples of the driving power conversion device 203 is a motor. Power in the battery 208 drives the driving power conversion device 203, and the rotating power of the driving power conversion device 203 is transmitted to the driving wheels 204a and 204b. Note that by using DC/AC conversion or AC/DC conversion in a necessary portion, an alternate current motor or a direct current motor can be used for the driving power conversion device 203. The various sensors 210 control the number of engine rotation via the vehicle control device 209 and controls the aperture of an unshown throttle valve (throttle aperture). The various sensors 210 include a speed sensor, an acceleration sensor, a sensor of the number of engine rotation, and the like.

The rotating power of the engine 201 is transmitted to the power generator 202, and power generated by the power generator 202 with the rotating power can be stored in the battery 208.

When the hybrid vehicle 200 reduces the speed with an unshown brake mechanism, the resisting power at the time of the speed reduction is added to the driving power conversion device 203 as the rotating power, and regenerative power generated by the driving power conversion device 203 with this rotating power is stored in the battery 208.

The battery 208 can be connected to an external power source of the hybrid vehicle 200, and accordingly, power can be supplied from the external power source by using the charging inlet 211 as an input inlet, and the received power can be stored.

Although not shown, an information processing device which performs information processing about vehicle control based on information about the secondary battery may be provided. Examples of such an information processing device include an information processing device which displays the remaining battery based on information about the remaining battery.

Note that the above description is made by taking an example of the series hybrid car which runs with a motor using power generated by a power generator driven by an engine or power obtained by storing the power in a battery. However, an embodiment of the present technology can also be applied effectively to a parallel hybrid car which uses the output of an engine and a motor as the driving power source and switches three modes as appropriate: driving with the engine only; driving with the motor only; and driving with the engine and the motor. Further, an embodiment of the present technology can also be applied effectively to a so-called electric vehicle which runs by being driven with a driving motor only, without an engine.

EXAMPLES

Although the present technology will now be described based on the following examples, the present technology is not limited to just these examples.

The examples of the present technology will be described in the following order.
1. Investigation of phase-separating solvent
2. Investigation of ceramic particle content
3. Investigation of crumpling properties 1. Investigation of Phase-Separating Solvent Example 1-1

First, alumina ($Al_2O_3$) particles, which are inorganic particles, with an average particle size of 0.5 μm and polyvinylidene fluoride (PVdF), which is a resin material, were mixed in a mass ratio of 90:10. The mixture was then dispersed in N-methyl-2-pyrrolidone (NMP) to prepare a resin solution.

It is noted that the average particle size of the above-described alumina particles was determines as follows.

The above-described resin solution was measured using a laser refraction-type particle size distribution measuring apparatus ("SALD 7100", manufactured by Shimadzu Corporation). It is noted that the average particle size represents the average particle diameter (μm) of a cumulative total of 50% by volume calculated from the smaller particles in a particle size distribution obtained by laser refraction.

Next, a 12 μm-thick polyethylene (PE) porous film was prepared as a substrate. Here, the substrate thickness is a value measured using a digital length measuring machine (Trade name: DIGIMICRO MF-501, manufactured by Nikon Corporation). Next, a surface layer was formed by coating the above resin solution on one face of this substrate, dipping in a phase-separating solvent (congealing solution) formed of ethanol, and then drying. In this manner, the intended separator was obtained.

Example 1-2

A separator was obtained in the same manner as Example 1-1, except for using a mixed solvent of a mixture of 90 vol. % ethanol and 10 vol. % NMP as the phase-separating solvent.

Example 1-3

A separator was obtained in the same manner as Example 1-1, except for using a mixed solvent of a mixture of 80 vol. % ethanol and 20 vol. % NMP as the phase-separating solvent.

A separator was obtained in the same manner as Example 1-1, except for using isopropyl alcohol (IPA) as the phase-separating solvent.

Example 1-5

A separator was obtained in the same manner as Example 1-1, except for using a mixed solvent of a mixture of 90 vol. % IPA and 10 vol. % NMP as the phase-separating solvent.

Example 1-6

A separator was obtained in the same manner as Example 1-1, except for using a mixed solvent of a mixture of 80 vol. % IPA and 20 vol. % NMP as the phase-separating solvent.

Example 1-7

A separator was obtained in the same manner as Example 1-1, except for using a mixed solvent of a mixture of 70 vol. % IPA and 30 vol. % NMP as the phase-separating solvent.

Comparative Example 1-1

A 12 nm-thick polyethylene (PE) porous film was prepared and used as a separator.

Comparative Example 1-2

A separator was obtained in the same manner as Example 1-1, except for using water as the phase-separating solvent.

Comparative Example 1-3

A separator was obtained in the same manner as Example 1-1, except for using a mixed solvent of a mixture of 50 vol. % water and 50 vol. % ethanol as the phase-separating solvent.

Comparative Example 1-4

A separator was obtained in the same manner as Example 1-1, except for using a mixed solvent of a mixture of 30 vol. % water and 70 vol. % ethanol as the phase-separating solvent.

Comparative Example 1-5

A separator was obtained in the same manner as Example 1-1, except for using a mixed solvent of a mixture of 50 vol. % water and 50 vol. % NMP as the phase-separating solvent.

Comparative Example 1-6

A separator was obtained in the same manner as Example 1-1, except for using a mixed solvent of a mixture of 30 vol. % water and 70 vol. % NMP as the phase-separating solvent.

Comparative Example 1-7

A separator was obtained in the same manner as Example 1-1, except for using a mixed solvent of a mixture of 20 vol. % water and 80 vol. % NMP as the phase-separating solvent.

Comparative Example 1-8

A separator was obtained in the same manner as Example 1-1, except for using a mixed solvent of a mixture of 70 vol. % ethanol and 30 vol. % NMP as the phase-separating solvent.

Comparative Example 1-9

A separator was obtained in the same manner as Example 1-1, except for using a mixed solvent of a mixture of 60 vol. % IPA and 40 vol. % NMP as the phase-separating solvent.

Comparative Example 1-10

A separator was obtained in the same manner as Example 1-1, except for using dimethyl carbonate (DMC) as the phase-separating solvent.

Comparative Example 1-11

A separator was obtained in the same manner as Example 1-1, except for using methyl ethyl ketone (MEK) as the phase-separating solvent.

Comparative Example 1-12

A separator was obtained in the same manner as Example 1-1, except for using acetone as the phase-separating solvent.

Comparative Example 1-13

A separator was obtained in the same manner as Example 1-1, except for using ethyl acetate as the phase-separating solvent.

(Evaluation)

The thus-obtained separators of Examples 1-1 to 1-7 and Comparative Examples 1-1 to 1-13 were evaluated as follows.

(Agglomeration Network Structure Observation)

Surface and cross-sectional SEM images of the surface layer were captured using a high-resolution field emission scanning electron microscope (Trade name: 5-4800, manufactured by Hitachi High-Technologies Corporation), and the presence of an agglomeration network structure was determined based on these SEM images. Among Examples 1-1 to 1-7 and Comparative Examples 1-1 to 1-13, the surface SEM images of the surface layer in Example 1-3 and Comparative Example 1-2 are representatively shown in FIGS. 10A to 10C and in FIGS. 11A to 11C. It is noted that FIG. 10C is an expanded view of the portion indicated by the frame in FIG. 10B.

(Surface Layer Porosity)

The porosity of the surface layer was determined as follows. First, a sample was formed by cutting the separator into a cutout size S ($cm^2$), and the mass (W1 (g)) and thickness (D (cm)) of this sample were measured. To measure the mass of the sample, electronic scales (Trade name: AUW220D, manufactured by Shimadzu Corporation) were used, and to measure the thickness of the sample, a digital length measuring machine (Trade name: DIGIMICRO MF-501, manufactured by Nikon Corporation) was used. Next, the mass of the substrate, which had been measured in advance, was subtracted from the mass (W1 (g)) of the sample to calculate the mass (W2 (g)) of the surface layer. It is noted that to measure the substrate mass the same apparatus as used to measure the mass of the sample was used. Next, the mass ($W_i$ (g), i=1, 2, ... n) of the type i (i=1, 2, ... n) of material constituting the surface layer was determined by calculating from the composition. Then, porosity was calculated from the following equation by dividing the mass ($W_i$ (g)) of each material by its true density ($d_i$ ($g/cm^3$)) and assuming the volume of each material.

Porosity (%)=100−{(mass W1/true density d1)+
(mass W2/true density d2)+ . . . +(mass
Wn/true density dn)}/(cutout size×thickness D)

(Surface Layer Thickness)

The thickness of the surface layer was determined as follows. First, the thickness of the separator was measured at ten points using a using a digital length measuring machine (Trade name: DIGIMICRO MF-501, manufactured by Nikon Corporation). Next, the average value of the ten points was taken as the thickness of the separator. The thickness of the surface layer was determined by subtracting the 12 µm thickness of the substrate from the separator thickness.

(Surface Layer Average Pore Size)

The average pore size of the surface layer was determined as follows. First, SEM observation of the surface was performed using a high-resolution field emission scanning electron microscope (Trade name: S-4800, manufactured by Hitachi High-Technologies Corporation), and the diameter (size) of the five largest pores that could be confirmed was measured. Next, the measured sizes were simply averaged (arithmetic mean) to determine the average diameter (average size). Here, the term diameter (size) means the largest length extending across the pore.

(Surface Layer Compressibility)

The compressibility of the surface layer was determined as follows. First, the thickness of the surface layer before compressing was determined in the same manner as the above-described "surface layer thickness" evaluation method. Next, one separator was sandwiched by thick paper, and the separator was compressed at a pressure of 100 $kg^2$ using a hand press. The thickness of the compressed separator was then measured, and the thickness of the compressed surface layer was determined from the difference in the surface layer thickness before and after compressing. Next, the thickness of the crumpled surface layer was calculated from the surface layer thickness before and after compressing. Then, the compressibility of the surface layer was determined by plugging in the thus-determined "crumpled surface layer thickness" and the "surface layer thickness before compressing" in the following equation.

Surface layer compressibility (%)=(crumpled surface
layer thickness/surface layer thickness before
compressing)×100

(Measurement of Air Permeability)

Air permeability was determined as follows. The time (seconds) taken for 100 cc of air to pass through a microporous film having a surface area of 645 $mm^2$ (circle having a diameter of 28.6 mm) was measured using a Gurley air permeability meter based on JIS P8117, and the obtained value was taken as the air permeability.

Table 1 shows the composition of the separators of Examples 1-1 to 1-7 and Comparative Examples 1-1 to 1-13 and the types of phase-separating solvents used in the production thereof.

TABLE 1

| | Substrate Thickness (μm) | P/B (mass ratio) | Surface Layer Average Particle Size (μm) | Phase-Separating Solvent Type | Phase-Separating Solvent Ratio (vol. %) |
|---|---|---|---|---|---|
| Example 1-1 | 12 | 90/10 | 0.5 | Ethanol | 100 |
| Example 1-2 | | | | Ethanol/NMP | 90/10 |
| Example 1-3 | | | | Ethanol/NMP | 80/20 |
| Example 1-4 | | | | IPA | 100 |
| Example 1-5 | | | | IPA/NMP | 90/10 |
| Example 1-6 | | | | IPA/NMP | 80/20 |
| Example 1-7 | | | | IPA/NMP | 70/30 |
| Comparative Example 1-1 | | — | — | — | — |
| Comparative Example 1-2 | | 90/10 | 0.5 | Water | 100 |
| Comparative Example 1-3 | | | | Water/Ethanol | 50/50 |
| Comparative Example 1-4 | | | | Water/Ethanol | 30/70 |
| Comparative Example 1-5 | | | | Water/NMP | 50/50 |
| Comparative Example 1-6 | | | | Water/NMP | 30/70 |
| Comparative Example 1-7 | | | | Water/NMP | 20/80 |
| Comparative Example 1-8 | | | | Ethanol/NMP | 70/30 |
| Comparative Example 1-9 | | | | IPA/NMP | 60/40 |
| Comparative Example 1-10 | | | | DMC | 100 |
| Comparative Example 1-11 | | | | MEK | 100 |
| Comparative Example 1-12 | | | | Acetone | 100 |
| Comparative Example 1-13 | | | | Ethyl Acetate | 100 |

P/B: (Filler (alumina) mass)/(Binder (PVdF) mass)

Table 2 shows the evaluation results of the separators of Examples 1-1 to 1-7 and Comparative Examples 1-1 to 1-13.

TABLE 2

| | Thickness (μm) | Surface Layer Porosity (%) | Surface Layer Pore Size (μm) | D2/D1 | Presence of Agglomeration Network | Compressed Thickness (μm) | Surface Layer Compressibility (%) | Air Permeability Before Compression (sec/100 ml) | Air Permeability After Compression (sec/100 ml) |
|---|---|---|---|---|---|---|---|---|---|
| Example 1-1 | 21.3 | 76.9 | 3.0 | 6.0 | Yes | 17.8 | 37.6 | 494 | 516 |
| Example 1-2 | 21.3 | 77.3 | 4.0 | 8.0 | Yes | 17.8 | 38.0 | 487 | 501 |
| Example 1-3 | 22.0 | 80.4 | 5.0 | 10.0 | Yes | 18.0 | 40.0 | 478 | 499 |
| Example 1-4 | 19.8 | 74.2 | 2.8 | 5.6 | Yes | 17.0 | 35.3 | 498 | 517 |
| Example 1-5 | 20.4 | 74.7 | 3.0 | 6.0 | Yes | 17.3 | 36.8 | 478 | 501 |
| Example 1-6 | 20.8 | 76.0 | 3.5 | 7.0 | Yes | 17.5 | 37.5 | 480 | 502 |
| Example 1-7 | 21.5 | 77.3 | 4.0 | 8.0 | Yes | 17.9 | 38.2 | 478 | 499 |
| Comparative Example 1-1 | 12.0 | — | — | — | — | 11.9 | — | 458 | 511 |
| Comparative Example 1-2 | 20.3 | 63.0 | 0.3 | 0.6 | No | 16.5 | 6.9 | 533 | 561 |
| Comparative Example 1-3 | 20.0 | 65.0 | 0.4 | 0.8 | No | 19.2 | 10.0 | 529 | 551 |
| Comparative Example 1-4 | 19.8 | 65.2 | 0.4 | 0.8 | No | 19.0 | 9.8 | 539 | 571 |
| Comparative Example 1-5 | 20.3 | 65.0 | 0.4 | 0.8 | No | 19.5 | 10.2 | 535 | 578 |
| Comparative Example 1-6 | 19.9 | 65.8 | 0.4 | 0.8 | No | 19.1 | 10.3 | 528 | 558 |
| Comparative Example 1-7 | | | | | Coated film separated | | | | |
| Comparative Example 1-8 | | | | | Coated film separated | | | | |
| Comparative Example 1-9 | | | | | Coated film separated | | | | |
| Comparative Example 1-10 | | | | | Coated film separated | | | | |
| Comparative Example 1-11 | | | | | Coated film separated | | | | |
| Comparative Example 1-12 | | | | | Coated film separated | | | | |
| Comparative Example 1-13 | | | | | Coated film separated | | | | |

D2/D1: (Average pore size of surface layer)/(average particle size of alumina particles)

The following can be understood from Tables 1 and 2.

In Example 1-1, ethanol is used as the phase-separating solvent. In this case, since the alumina particles form an agglomeration network structure when the surface layer is being fixed to the substrate surface, the average pore size is larger and the porosity higher than in Comparative Examples 1-2 to 1-7. Therefore, in Example 1-1, the increase in air permeability caused by the surface layer can be suppressed more than in Comparative Examples 1-2 to 1-7. Further, since compressibility is high because the surface layer crumples during compression, and large pores can be formed in advance, the increase in air permeability during compression can be suppressed. By thus suppressing the increase in air permeability, cycling characteristics and power density characteristics can be improved.

In Examples 1-2 and 1-3 and in Comparative Example 1-8, a mixed solvent of ethanol and NMP is used as the phase-separating solvent. In this case, the average pore size and the porosity tend to increase with an increase in the mixed amount of NMP. Further, the increase in air permeability during compression tends to be suppressed more. However, if the mixed amount of NMP is increased to 30 vol. %, the surface layer cannot be fixed to the substrate surface.

In Example 1-4, IPA is used as the phase-separating solvent. In this case too, the same trend as in Example 1 that used ethanol as the phase-separating solvent is seen.

In Examples 1-5 to 1-7 and in Comparative Example 1-9, a mixed solvent of IPA and NMP is used as the phase-separating solvent. In this case, the average pore size and the porosity tend to increase with an increase in the mixed amount of NMP. Further, the increase in air permeability during compression tends to be suppressed more. However, if the mixed amount of NMP is increased to 40 vol. %, the surface layer cannot be fixed to the substrate surface.

In Comparative Example 1-1, just a porous film, which is the substrate, is used as the separator. In this case, although there is hardly any change in the thickness before and after compression, since the surface of the microporous film is made to directly crumple by the compression, the air permeability tends to increase after compression compared with before.

In Comparative Example 1-2, water is used as the phase-separating solvent. In this case, since the alumina particles do not form an agglomeration network structure when the surface layer is being fixed to the substrate surface, in Comparative Example 1-2 the average pore size is smaller and the porosity is also lower than in Examples 1-1 to 1-7. Therefore, in Comparative Example 1-2 the increase in air permeability caused by the surface layer is greater than in Examples 1-1 to 1-7. Further, since compressibility is low because the surface layer does not easily crumple during compression, and large pores cannot be formed in advance, the increase in air permeability during compression cannot not be suppressed.

In Comparative Examples 1-3 and 1-4, a mixed solvent of water and ethanol is used as the phase-separating solvent. In this case, the same trend as in Comparative Example 1-2 is seen. Namely, when water is mixed in ethanol (alcohol), a trend like that seen in Examples 1-1 to 1-7 is not obtained even though the phase-separating solvent includes ethanol (alcohol).

In Comparative Examples 1-5 to 1-7, a mixed solvent of water and NMP is used as the phase-separating solvent. In this case, until an NMP mixed amount of 70 vol. %, the same trend as in Comparative Example 1-2 is seen. However, when the NMP mixed amount is increased to 80 vol. %, the surface layer cannot be fixed to the substrate surface.

In a technique that uses a mixed solvent of water and NMP as a phase-separating solvent, the network structure (three-dimensional network structure) of the resin material is controlled by reducing the rate of phase separation of the resin material (PVdF) utilizing the phenomenon of viscoelastic phase separation. However, even in this technique, an agglomeration network structure of ceramic particles cannot be formed. Namely, an agglomeration network structure of ceramic particles cannot be formed unless an alcohol, such as ethanol or IPA, or a mixed solvent thereof is used as the phase-separating solvent.

In Comparative Examples 1-10 to 1-13, DMC, MEK, acetone, and ethyl acetate, not alcohol or water, are used as the phase-separating solvent. In this case, the alumina particles cannot be fixed to the resin material (PVdF). Namely, the surface layer cannot be fixed to the substrate surface.

The following can be understood from FIGS. 10A to 11C.

In Comparative Example 1-1, the ceramic particles are generally uniformly packed in the separator (refer to FIG. 11A). Voids are formed among the packed ceramic particles. The pores in the separator are formed by these voids (refer to FIGS. 11B and 11C). Since the pores are formed by the voids among the packed ceramic particles, the size of the pores is smaller than the particle size of the ceramic particles. The resin material forms a three-dimensional network structure (network structure of the resin material) in the voids among the ceramic particles. Consequently, the pore size of this network is much smaller than the particle size of the ceramic particles.

In Example 1-3, many pores are formed in the separator due to the ceramic particles agglomerating (refer to FIG. 10A). A three-dimensional network structure of the resin material hardly exists in the separator. Further, the pores are formed in the separator due to the agglomerations of ceramic particles growing while cross-linking with each other to form a network (refer to FIGS. 10B and 10C). Consequently, the size of the pores is larger than the particle size of the ceramic particles. Pores having such a large size cannot be formed in Comparative Example 1-2, in which the separator pores are formed by voids among the particles.

It is noted that even in the SEM images of Examples 1-1, 1-2, and 1-4 to 1-7, almost the same structure was observed as in the above-described SEM image of Example 1-3. Further, in the SEM images of Comparative Example 1-3 to 1-6, almost the same structure was observed as in the above-described SEM image of Comparative Example 1-2.

Adding all the above results together, the following can be understood.

By using an alcohol as the phase-separating solvent, an agglomeration network structure can be formed. Further, this agglomeration network structure not only enables the average pore size of the surface layer and the porosity to be increased, but also makes it easier for the surface layer to crumple by applying pressure. Further, since the surface layer has good air permeability, power density can be improved.

Even when a mixed solvent of an alcohol is used, an agglomeration network structure can be formed the same as when a single solvent of an alcohol is used. However, since it is difficult to form an agglomeration network structure if the solvent mixed with the alcohol is water, it is preferred that the solvent mixed with the alcohol is an organic solvent.

There is a preferred range for the mixing ratio of the mixed solvent of an alcohol. This mixing ratio is different depending on the type of solvent included in the mixed solvent. Therefore, it is preferred to appropriately adjust the mixing ratio of the mixed alcohol solvent based on the components.

2. Investigation of Ceramic Particle Content

Example 2

A separator was obtained in the same manner as in Example 1-3.

Comparative Example 2-1

A separator was obtained in the same manner as in Comparative Example 1-2.

Comparative Example 2-2

A separator was obtained in the same manner as in Comparative Example 2-1, except that the alumina and PVdF were mixed in a mass ratio of 85:15.

Comparative Example 2-3

A separator was obtained in the same manner as in Comparative Example 2-1, except that the alumina and PVdF were mixed in a mass ratio of 84:16.

Comparative Example 2-4

A separator was obtained in the same manner as in Comparative Example 2-1, except that the alumina and PVdF were mixed in a mass ratio of 83:17.

Comparative Example 2-5

A separator was obtained in the same manner as in Comparative Example 2-1, except that the alumina and PVdF were mixed in a mass ratio of 80:20.

Comparative Example 2-6

A separator was obtained in the same manner as in Comparative Example 2-1, except that the alumina and PVdF were mixed in a mass ratio of 77:23.

Comparative Example 2-7

A separator was obtained in the same manner as in Comparative Example 2-1, except that the alumina and PVdF were mixed in a mass ratio of 70:30.

Comparative Example 2-8

A separator was obtained in the same manner as in Comparative Example 2-1, except that the alumina and PVdF were mixed in a mass ratio of 50:50.

Comparative Example 2-9

A separator was obtained in the same manner as in Comparative Example 2-1, except that the alumina and PVdF were mixed in a mass ratio of 30:70.

(Surface Layer Porosity)

The surface layer porosity of the thus-obtained separators of Example 2 and Comparative Examples 2-1 to 2-9 was determined based on the same method as in the above-described Examples 1-1 to 1-7 and Comparative Examples 1-1 to 1-3. The results are shown in Table 3 and FIG. 12.

Table 1 shows the composition and the evaluation results of the separators of Example 2 and Comparative Examples 2-1 to 2-9.

TABLE 3

|  | Particle Ratio mass % | Resin Ratio (mass %) | Porosity (%) |
|---|---|---|---|
| Comparative Example 2-1 | 90 | 10 | 63.0 |
| Comparative Example 2-2 | 85 | 15 | 62.7 |
| Comparative Example 2-3 | 84 | 16 | 63.3 |
| Comparative Example 2-4 | 83 | 17 | 61.2 |
| Comparative Example 2-5 | 80 | 50 | 63.0 |
| Comparative Example 2-6 | 77 | 23 | 67.3 |
| Comparative Example 2-7 | 70 | 30 | 75.1 |
| Comparative Example 2-8 | 50 | 50 | 79.3 |
| Comparative Example 2-9 | 30 | 70 | 80.0 |
| Example 2 | 90 | 10 | 80.4 |

Figure 12:
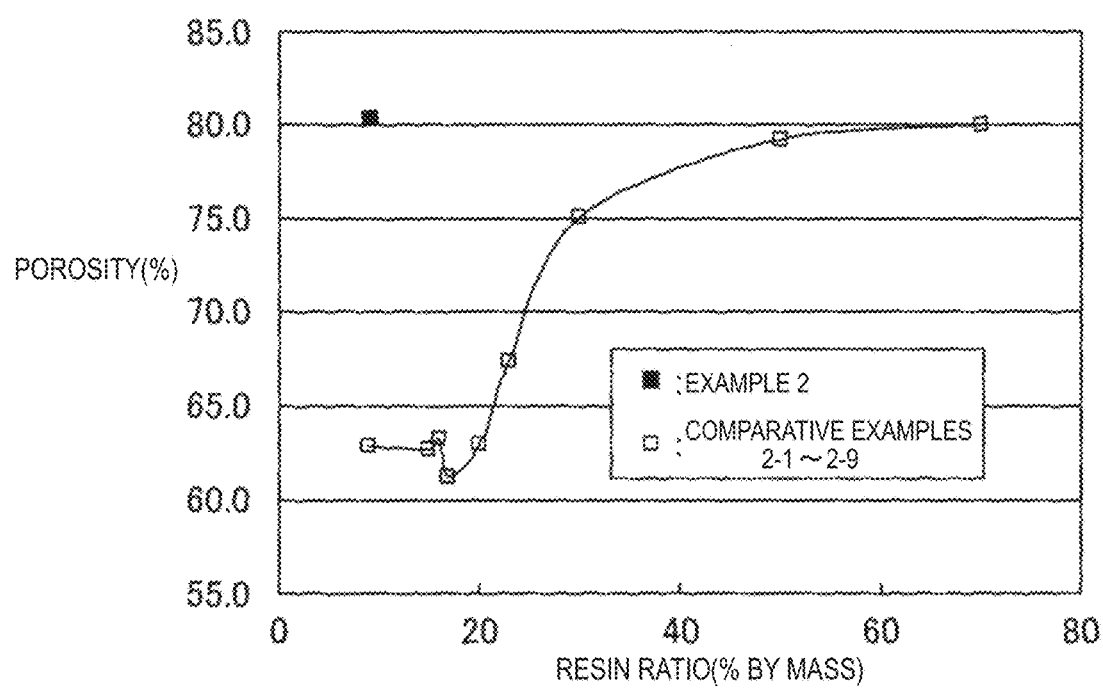
FIG. 12 is a graph illustrating a relationship between resin ratio and porosity of the separator of Example 2 and Comparative Examples 2-1 to 2-9.

From Table 3 and FIG. 12 the following can be understood.

In Comparative Examples 2-1 to 2-9, when the content of ceramic particles based on the total amount of the resin material and the ceramic particles is within the range of 30% by mass or more to less than 70% by mass (i.e., the resin material is more than 30% by mass to 70% by mass or less), porosity tends to gradually decrease with an increase in the content of ceramic particles.

Within the above-described range for the content of the ceramic particles and the resin material, a porous substance is formed due to the generation of a network structure (three-dimensional network structure) of the resin material. Namely, the porosity of the surface layer is determined based on the formation of the resin material network structure.

In Comparative Examples 2-1 to 2-9, when the content of ceramic particles is within the range of 70% by mass or more to less than 80% by mass (i.e., the resin material content is more than 20% by mass to 30% by mass or less), porosity tends to suddenly decrease with an increase in the content of ceramic particles.

The reason why porosity suddenly decreases in the above-described range for the content of the ceramic particles and the resin material is as follows. Namely, it is thought that when the content of ceramic particles is 70% by mass or more (i.e., the resin material content is 30% by mass or less), the porous substance formation method starts to change from generation of a network structure (three-dimensional network structure) of the resin to generation of voids among the packed ceramic particles. Further, until the content of ceramic particles reaches 80% by mass (i.e., the resin material content is 20% by mass), the structures generated by the above-described two porous substance formation methods coexist.

In Comparative Examples 2-1 to 2-9, when the content of ceramic particles is within the range of 70% by mass or more to less than 80% by mass (i.e., the resin material content is more than 20% by mass to 30% by mass or less), porosity tends to suddenly decrease with an increase in the content of ceramic particles.

When the content of the ceramic particles and resin material is in the above range, the pores are produced by the gaps among the filled ceramic particles. Namely, the size of the pores and the porosity value are determined by the voids among the ceramic particles. Since the average pore size of the pores (voids) among the ceramic particles is equal to or less than the average particle size of the inorganic particles, as described above, the porosity is a very low value.

Thus, when pores are formed by voids among ceramic particles, the pore size is controlled by the particle size. In this case, in order to achieve a large pore size and a high porosity, the ceramic particles have to have a large particle size. However, if such large ceramic particles are used for the surface layer, the separator becomes too thick, which causes the battery capacity to deteriorate. Further, since the ceramic particles are not easily crushed by applying pressure, a surface layer that includes the ceramic particles also does not easily crumple. Therefore, it is difficult for a separator having such a surface layer to absorb electrode expansion.

In Example 2, within the range of a ceramic particle content, which in the above-described Comparative Examples 2-1 to 2-9 is a very low value, of 80% by mass or more (resin material content of 20% by mass or less), porosity can be improved. Namely, in Example 2, porosity can be improved due to the formation of a network structure by the ceramic particles in the content range of ceramic particles in which in the above-described Comparative Examples 2-1 to 2-9 porosity based on voids among the inorganic particles is predominant.

In Example 2, since the pore size of the surface layer is not defined by the particle size of the inorganic particles, a large pore size and a high porosity can be obtained even if the surface layer does not include inorganic particles with a large particle size. Consequently, a large pore size and a high porosity can be obtained without sacrificing battery capacity. If a separator that includes such a surface layer is applied in a battery, the load characteristics of the battery can be improved.

Adding the above results together, a technology that realizes a high porosity by forming pores with a large pore size with an agglomeration network structure of ceramic particles is preferably applied in a surface layer having a content of ceramic particles of 70% by mass or more, and more preferably of 80% by mass or more.

3. Investigation of Crumpling Properties

Example 3

A separator was obtained in the same manner as Example 1-1, except that the coating thickness was changed by adjusting the resin solution coating conditions.

Comparative Example 3

A separator was obtained in the same manner as Comparative Example 1-2, except that the coating thickness was changed by adjusting the resin solution coating conditions.

The thus-obtained separators of Example 3 and Comparative Example 3 were evaluated as follows.
(Surface Layer Thickness)

The surface layer thickness was determined in the same manner as in the above-described Examples 1-1 to 1-7 and Comparative Examples 1-1 to 1-13.
(Surface Layer Porosity)

The surface layer porosity was determined in the same manner as in the above-described Examples 1-1 to 1-7 and Comparative Examples 1-1 to 1-13.
(Micro-Compression Test)

The relationship between compression test force and crumpling amount was determined by compressing one separator with an indenter having a diameter of 500 μm using a micro-compression testing machine (Trade name: MCT-W500J, manufactured by Shimadzu Corporation). The results are shown in Table 4 and FIG. 13.

Table 4 shows the configuration and the evaluation results of the separators of Example 3 and Comparative Example 3.

TABLE 4

| | P/B (mass ratio) | Thickness (μm) | Phase-Separating Solvent | Porosity (%) | Displacement at 500 N/cm$^2$ (μm) |
|---|---|---|---|---|---|
| Example 2 | 90/10 | 21.5 | Ethanol | 77.0 | 5.1 |
| Comparable Example 3 | 90/10 | 21.5 | Water | 63.0 | 2.5 |

P/B: (Filler (alumina) mass)/(Binder (PVdF) mass)

Figure 13:
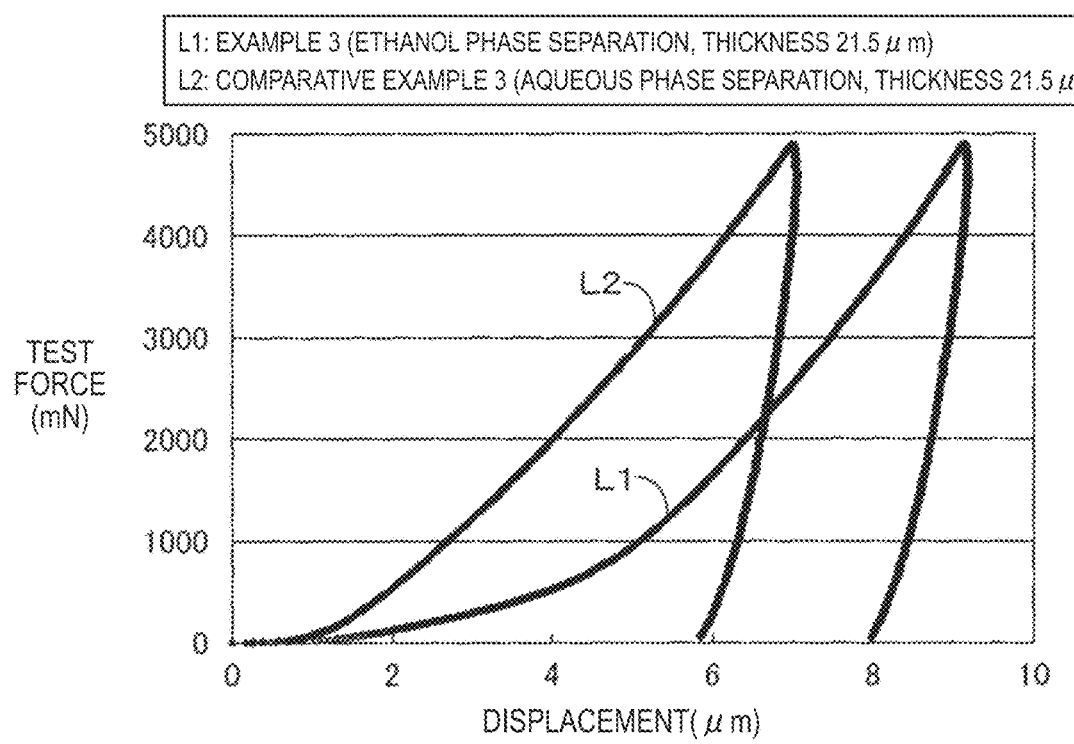
FIG. 13 is a graph illustrating a result of a microcompression test of the separator of Example 3 and Comparative Example 3.

From Table 4 and FIG. 13, the following can be understood.

Although the substrate and the surface layer of Example 3 and Comparative Example 3 have the same thickness, in Example 3, it can be seen that greater crumpling was exhibited than in Comparative Example 3 at a low compression test force. This is because the agglomeration networks formed in Example 3 using an alcohol or a mixed solvent thereof broke and crumpled.

Based on the above-described results regarding the compressibility of the surface layer (Examples 1-1 to 1-7 and Comparative Examples 1-1 to 1-13) and the micro-compression test (Example 3 and Comparative Example 3), at the surface layer having an agglomeration network structure, a high compressibility can be realized due to the collapse of the agglomeration network structure even at a low compressive force. Since the surface layer has large pores from the agglomeration network structure, an increase in the air permeability when forming the surface layer and after compression can be suppressed. Therefore, the cycling characteristics and the power density of the battery can be improved.

The embodiments and examples of the present technology have been specifically described above. However, the present technology is not limited to the above-described embodiments. Various modifications of the present technology can be made without departing from the technical spirit of the present technology.

For example, the configuration, the method, the process, the shape, the material and the value in the above-described embodiments and examples are merely examples, and other configurations, methods, shapes, materials and values may be used, as necessary.

Further, the configuration, method, shape, material and value of the above-described embodiments may be combined without departing from the scope and the spirit of the present disclosure.

Further, although a case was described in the above-described embodiments and examples in which the particles forming the agglomeration network structure were inorganic particles, the particles are not limited to inorganic particles, organic particles or inorganic/organic hybrid particles may also be used. Namely, as the particles, at least one kind selected from the group consisting of inorganic particles, organic particles, and inorganic/organic hybrid particles may be used. For the organic particle, for example, a methyl polymethacrylate resin, an acrylic styrene resin, a polymethyl methacrylate resin, a silicone resin, a polystyrene resin, a polycarbonate resin, a melamine resin, a polyolefin resin, a polyester resin, a polyamide resin, a polyimide resin, a polyfluoroethylene resin and the like may be used. Examples of organic/inorganic hybrid particles that can be used include use silica/acrylic composite particles, silica/melamine composite particles and the like.

Further, in the above-described examples, although a case in which the surface layer was formed using PVdF as the resin material (binder) was illustrated as an example, the present technology is not limited to this example. Namely, in the present technology, the inorganic particles and the resin material are not limited to alumina particles and PVdF, as long as the surface layer can form an agglomeration network structure from the inorganic particles. This is because, in the present technology, the growth into the agglomeration network structure is induced by suppressing the sudden spinodal decomposition of the resin material by utilizing agglomeration properties that are based on interaction between the inorganic particles and the resin material. Namely, as long as the phase-separating solvent is appropriately selected based on the selection of the inorganic particles and the resin material, the agglomeration network structure can be formed even without alumina particles and PVdF.

Further, in the above-described examples, as the method for producing the separator, although a method for forming the agglomeration network structure with an alcohol phase-separating solvent was described as an example, the method for producing the separator is not limited to this example. For example, if drying the resin solution after coating, the above-described agglomeration network structure can be formed by controlling the agglomeration properties, the rate of drying and the like of the inorganic particles and the resin material (binder).

Additionally, the present technology may also be configured as below.

(1)

A separator including:

a first layer of a porous substance; and a second layer that is provided on at least one face of the first layer and that includes a resin material and particles, wherein the second layer has an agglomeration network structure of the particles.

(2)

The separator according to (1), wherein the agglomeration network structure is a structure in which agglomerations of the particles are interlinked by the particles.

(3)

The separator according to (1) or (2), wherein a content of the particles based on a total amount of the resin material and the particles is 70% by mass or more.

(4)

The separator according to (1) or (2), wherein a content of the particles based on a total amount of the resin material and the particles is 80% by mass or more.

(5)

The separator according to any one of (1) to (4), wherein the second layer has an average pore size that is 5.6-times or more to 10.0-times or less an average particle size of the particles.

(6)

The separator according to any one of (1) to (4), wherein the second layer has an average pore size of 2.8 µm or more to 5.0 µm or less.

(7)

The separator according to any one of (1) to (6), wherein the second layer has a porosity of 74% or more to 90% or less.

(8)

The separator according to any one of (1) to (7), wherein the resin material includes a fluororesin.

(9)

The separator according to (8), wherein the fluororesin is polyvinylidene fluoride.

(10)

The separator according to any one of (1) to (9), wherein the particles include aluminum oxide.

(11)

A battery that includes a positive electrode, a negative electrode, an electrolyte, and a separator, wherein the separator includes:

a first layer of a porous substance; and a second layer that is provided on at least one face of the first layer and that includes a resin material and particles, and wherein the second layer has an agglomeration network structure of the particles.

(12)

The battery according to (11), wherein the negative electrode is an alloy-based negative electrode.

(13)

A battery pack including the battery according to (11).

(14)

An electronic device including the battery according to (11), wherein the electronic device receives a supply of power from the battery.

(15)

An electric vehicle including:

the battery according to (11);

a conversion device configured to receive a supply of power from the battery and convert the received power into a vehicle drive force; and a control device configured to perform information processing relating to vehicle control based on information regarding the battery.

(16)

A power storage device including:

the battery according to (11), wherein the power storage device is configured to supply power to an electronic device connected to the battery.

(17)

The power storage device according to (16), including:

a power information control device configured to exchange signals with another device via a network, wherein the power storage device is configured to perform charging and discharging control of the battery based on information received by the power information control device.

(18)

A power system configured to receive a supply of power from the battery according to (11), or to supply power to the battery from a power generation device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 separator
2 substrate
3 surface layer
11 battery can
12, 13 insulating plate
14 battery cap
15 safety valve mechanism
16 positive temperature coefficient element
17 gasket
20, 30 wound electrode body
21, 33 positive electrode
21A, 33A positive electrode current collector
21B, 33B positive electrode active material layer
22, 34 negative electrode
22A, 34A negative electrode current collector
22B, 34B negative electrode active material layer
23, 35 separator
24 center pin
25, 31 positive electrode lead
26, 32 negative electrode lead
36 electrolyte layer
37 protective tape
40 package member
41 contact film

The invention claimed is:

1. A separator comprising:
    a first layer of a porous substance; and
    a second layer that is provided on at least one face of the first layer and that includes a resin material and particles,
    wherein the second layer has a three-dimensional agglomeration network structure that includes chains of the particles cross-linked to one another and that includes pores in interstitial spaces between the cross-linked particle chains,
    wherein an average pore size is 5.6-times or more to 10.0-times or less an average particle size of the particles,
    wherein the second layer has an average pore size of 2.8 µm or more to 5.0 µm or less, and
    wherein the particles have an average particle size from 0.3 µm to 0.8 µm.

2. The separator according to claim 1, wherein the agglomeration network structure is a structure in which agglomerations of the particles are interlinked by the particles.

3. The separator according to claim 1, wherein a content of the particles based on a total amount of the resin material and the particles is 70% by mass or more.

4. The separator according to claim 1, wherein a content of the particles based on a total amount of the resin material and the particles is 80% by mass or more.

5. The separator according to claim 1, wherein the second layer has a porosity of 74% or more to 90% or less.

6. The separator according to claim 1, wherein the resin material includes a fluororesin.

7. The separator according to claim 6, wherein the fluororesin is polyvinylidene fluoride.

8. The separator according to claim 1, wherein the particles include aluminum oxide.

9. A battery that includes a positive electrode, a negative electrode, an electrolyte, and a separator,
    wherein the separator comprises:
    a first layer of a porous substance; and
    a second layer that is provided on at least one face of the first layer and that includes a resin material and particles, and
    wherein the second layer has a three-dimensional agglomeration network structure that includes chains of the particles cross-linked to one another and that includes pores in interstitial spaces between the cross-linked particle chains,
    wherein an average pore size is 5.6-times or more to 10.0-times or less an average particle size of the particles,
    wherein the second layer has an average pore size of 2.8 µm or more to 5.0 µm or less, and
    wherein the particles have an average particle size from 0.3 µm to 0.8 µm.

10. The battery according to claim 9, wherein the negative electrode is an alloy-based negative electrode.

11. A battery pack comprising the battery according to claim 9.

12. An electronic device comprising the battery according to claim 9, wherein the electronic device receives a supply of power from the battery.

13. An electric vehicle comprising:
    the battery according to claim 9;
    a conversion device configured to receive a supply of power from the battery and convert the received power into a vehicle drive force; and
    a control device configured to perform information processing relating to vehicle control based on information regarding the battery.

14. A power storage device comprising:
    the battery according to claim 9,
    wherein the power storage device is configured to supply power to an electronic device connected to the battery.

15. The power storage device according to claim 14, comprising:
    a power information control device configured to exchange signals with another device via a network,
    wherein the power storage device is configured to perform charging and discharging control of the battery based on information received by the power information control device.

16. A power system configured to receive a supply of power from the battery according to claim 9, or to supply power to the battery from a power generation device or a power network.

* * * * *